(12) United States Patent
Saito

(10) Patent No.: US 7,187,846 B2
(45) Date of Patent: Mar. 6, 2007

(54) RECORDING APPARATUS, PICTURE RECORDING APPARATUS, AND METHOD THEREFOR

(75) Inventor: Akio Saito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1010 days.

(21) Appl. No.: 09/875,191

(22) Filed: Jun. 7, 2001

(65) Prior Publication Data

US 2002/0018637 A1 Feb. 14, 2002

(30) Foreign Application Priority Data

Jun. 7, 2000 (JP) ............................. 2000-170705

(51) Int. Cl.
*H04N 5/76* (2006.01)
*H04N 7/00* (2006.01)
(52) U.S. Cl. ............................. 386/69; 386/70; 386/95
(58) Field of Classification Search ................. 725/90; 715/721; 386/55, 83, 93, 125
See application file for complete search history.

(56) References Cited

U.S. PATENT DOCUMENTS

| | | | | |
|---|---|---|---|---|
| 5,774,622 A | * | 6/1998 | Kato | 386/68 |
| 5,818,439 A | * | 10/1998 | Nagasaka et al. | 725/87 |
| 5,974,218 A | * | 10/1999 | Nagasaka et al. | 386/46 |
| 6,005,565 A | * | 12/1999 | Legall et al. | 715/721 |
| 6,078,726 A | * | 6/2000 | Gotoh et al. | 386/117 |
| 6,160,950 A | * | 12/2000 | Shimazaki et al. | 386/46 |
| 6,222,532 B1 | * | 4/2001 | Ceccarelli | 715/723 |
| 6,584,463 B2 | * | 6/2003 | Morita et al. | 707/3 |

FOREIGN PATENT DOCUMENTS

JP 10-326480 12/1998

* cited by examiner

*Primary Examiner*—Thai Q. Tran
*Assistant Examiner*—Gelek Topgyal
(74) *Attorney, Agent, or Firm*—Fitzpatrick, Cella, Harper & Scinto

(57) ABSTRACT

Video signals input from a video input/output section are sequentially recorded on a magnetic tape section. Desired procedure information is selected from a plurality of pieces of procedure information each of which is stored in a digest video procedure storage section and defines image information capture start timing and capture time in the recording process. A capture section acquires a video signal in accordance with the capture timing and capture time of the selected procedure information and stores the video signal in a digest temporary storage section as a digest video signal. After video signal recording is ended, the digest video signal is recorded on the magnetic tape section.

19 Claims, 19 Drawing Sheets

FIG. 2A

| FIELD | CAPTURE TIMING (%) | CAPTURE TIME (SEC) |
|---|---|---|
| MOVIE | 0 | 3 |
| | 5 | 3 |
| | 7 | 3 |
| | 10 | 4 |
| | 17 | 5 |
| | 27 | 5 |
| | 35 | 5 |
| | 52 | 5 |
| | 65 | 5 |
| | 75 | 5 |
| | 85 | 5 |

FIG. 2B

| FIELD | CAPTURE TIMING (%) | CAPTURE TIME (SEC) |
|---|---|---|
| DOCUMENTARY | 0 | 5 |
| | 10 | 5 |
| | 20 | 5 |
| | 30 | 5 |
| | 40 | 4 |
| | 52 | 4 |
| | 60 | 4 |
| | 70 | 4 |
| | 80 | 4 |
| | 90 | 4 |
| | 95 | 4 |

FIG. 2C

| FIELD | CAPTURE TIMING (%) | CAPTURE TIME (SEC) |
|---|---|---|
| SPORTS | 0 | 3 |
| | 5 | 3 |
| | 10 | 3 |
| | 15 | 3 |
| | 20 | 3 |
| | 25 | 3 |
| | 30 | 3 |
| | 35 | 3 |
| | 40 | 3 |
| | 45 | 3 |
| | 50 | 3 |
| | 55 | 3 |
| | 60 | 3 |
| | 70 | 3 |
| | 80 | 3 |
| | 95 | 3 |

FIG. 2D

| FIELD | CAPTURE TIMING (%) | CAPTURE TIME (SEC) |
|---|---|---|
| VARIETY | 0 | 5 |
| | 5 | 5 |
| | 10 | 5 |
| | 15 | 5 |
| | 20 | 5 |
| | 30 | 4 |
| | 40 | 4 |
| | 50 | 4 |
| | 60 | 4 |
| | 70 | 4 |
| | 80 | 4 |
| | 95 | 4 |

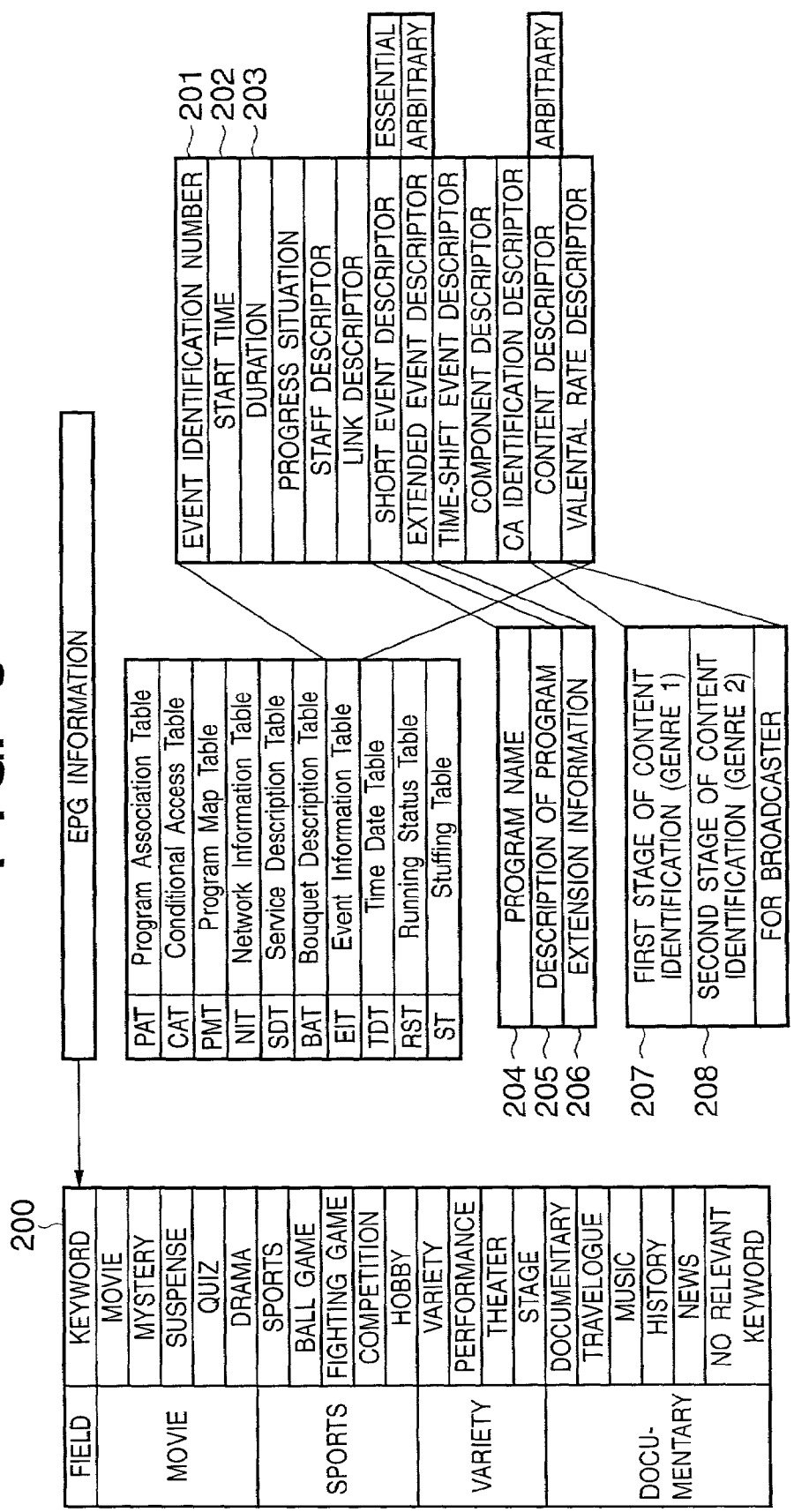

FIG. 9

| FIELD | CAPTURE TIMING (%) | CAPTURE TIME (SEC) |
|---|---|---|
| NEW 1 | 0 | 4 |
| | 10 | 4 |
| | 20 | 4 |
| | 30 | 4 |
| | 40 | 4 |
| | 50 | 4 |
| | | |
| | | |
| | | |
| | | |
| | | |
| | | |
| | | |
| | | |
| | | |

| 004 | 005 | 007 | 009 | 000 | |

| PROCEDURE | CAPTURE INTERVAL (MIN) | MINIMUM CAPTURE TIME (SEC) | ALLOWABLE CAPTURE TIME (SEC) |
|---|---|---|---|
| 1 | 5 | 2 | 30 |
| 2 | 10 | 3 | 60 |
| 3 | 15 | 4 | 60 |
| 4 | 20 | 5 | 60 |
| 5 | 30 | 5 | 120 |

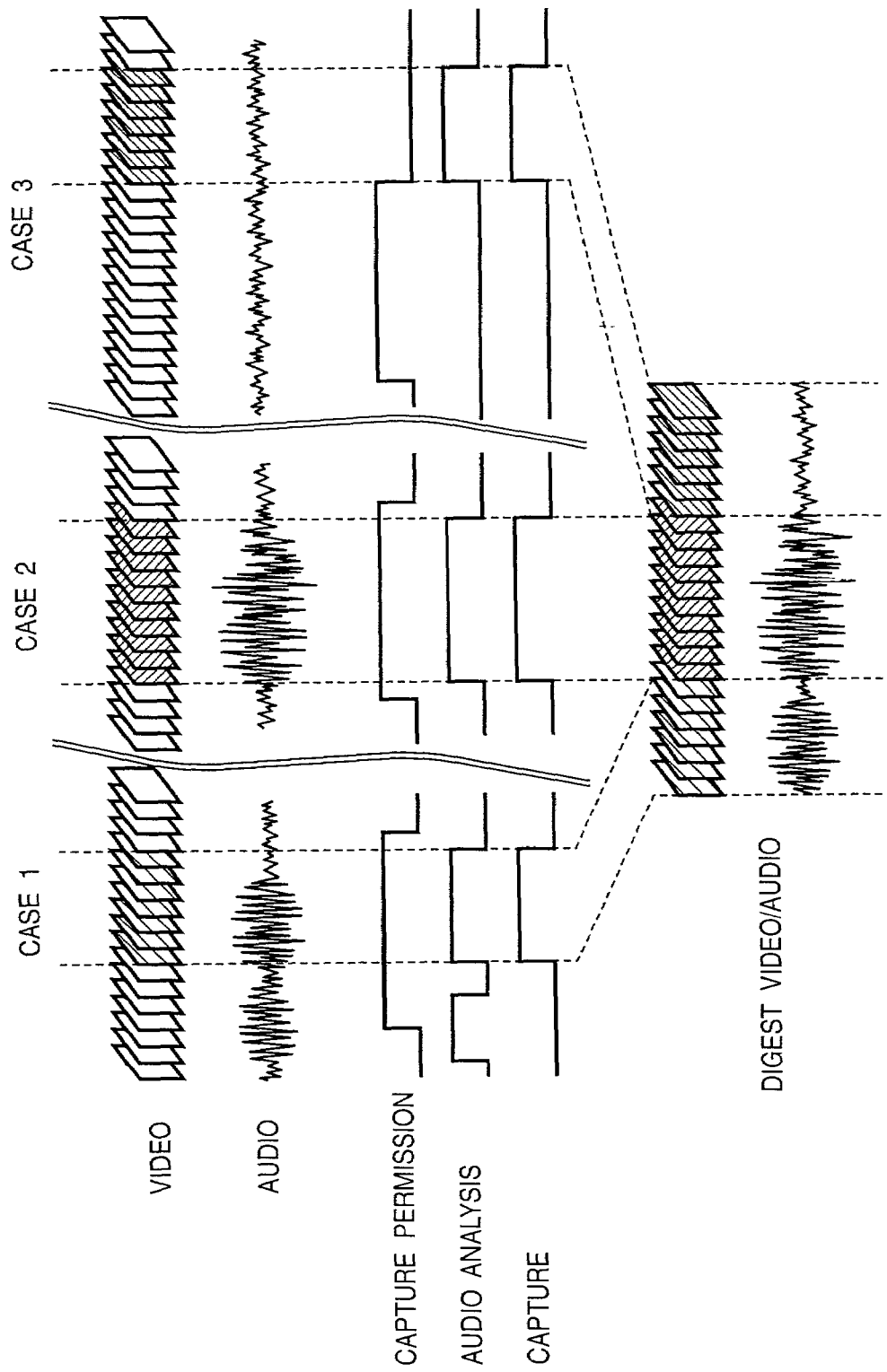

RECORDING APPARATUS, PICTURE RECORDING APPARATUS, AND METHOD THEREFOR

FIELD OF THE INVENTION

The present invention relates to a digest video generation and digest playback apparatus used to record a video.

BACKGROUND OF THE INVENTION

A TV viewer who wants to record and watch a program imagines the program from program information on newspaper, TV guide, or the like, becomes interested in the program, and records it. However, the actually recorded program may be a disappointment against the user's expectations. It is convenient if the user can determine the contents of a recorded program somewhat by watching its digest version.

Additionally, it is hard to properly decide to rent or buy movie software or a documentary video at a store only by its name or brief synopsis that introduces the contents. However, if the digest video is available, the contents can be more appropriately determined.

Conventionally, a digest video is generated by capturing still images at a predetermined time interval and sequentially displaying them at a high speed, capturing moving images at a predetermined period and sequentially continuously displaying them, detecting the motion on the screen (by motion detection using luminance and color different signals or a method using histogram of pixels) to acquire scene change information, selecting representative images on the basis of the information, and sequentially displaying the images, extracting and recording a feature point from an audio signal, or combining the above techniques.

However, a video of certain kind cannot be understood unless many points are generally presented. The digest of another video preferably excludes the ending. For still another video, only scenes with motions are preferably put into the digest. That is, the composition of the optimum digest video changes depending on the field, i.e., type of video to be recorded.

In addition, the requirement for a digest video also changes depending on the type of video. More specifically, the user sometimes requires a digest video to present the summary in detail as much as possible. However, in other cases, he/she wants to see the representative scenes or the time-sequential development of the scenes or requires the digest video to function as a promotion video. The prior art cannot completely meet these requirements.

In a digest video containing only video data, the audio data is not played back, and the content preview may be insufficient. In the prior art, if the audio data is also played back in the digest video, playback may start or stop in the middle of words, and they are very hard to listen to.

SUMMARY OF THE INVENTION

The present invention has been made in consideration of the above problems, and has as its object to automatically generate digest image information from image information and also change the capture timing from the image information to allow generation of digest image information appropriate to the image contents.

It is another object of the present invention to allow generation of digest image information with audio data for providing more natural playback contents by controlling the image information capture timing in consideration of the audio state.

According to one aspect of the present invention, the foregoing object is attained by providing a recording apparatus comprising: input means for inputting an image signal sequence; recording means for recording the image signal sequence input by the input means on a storage device; and extraction means for extracting some image signals from the image signal sequence, recorded on the storage device, in accordance with a plurality of pieces of procedure information that represent predetermined extraction procedures different from each other to extract the image signals, the procedure information designating an extraction timing to extract some image signals at a changeable interval, and the extraction means extracting some image signals in accordance with the extraction timing designated by the procedure information.

According to another aspect of the present invention, the foregoing object is attained by providing recording apparatus comprising: input means for inputting an information signal stream containing image and audio signals; recording means for recording the image and audio signals input by the input means on a recording medium; setting means for setting an extraction timing for extracting an image signal; determination means for determining an extraction period for extracting a part of image signals from the image signals recorded by the recording means on the basis of, the audio signal during a period based on the extraction timing set by the setting means and the extraction timing set by the setting means; and extraction means for extracting a part of image signals from the image signals recorded by the recording means in accordance with the extraction period determined by the determination means.

In still another aspect of the present invention, the foregoing object is attained by providing a recording apparatus comprising: reception means for receiving a broadcast wave and detecting image signals superposed on the broadcast wave; recording means for recording the image signal detected by the reception means on a storage medium; a memory for storing a plurality of pieces of different extraction procedure information each of which defines a predetermined extraction interval and extraction period related to the image signals, the plurality of pieces of extraction procedure information defining changeable extraction intervals; and extraction means for selecting one of the plurality of pieces of extraction procedure information stored in the memory in accordance with the image signals recorded by the recording means and extracting a part of image signals from the image signals, recorded by the recording means, on the basis of the extraction procedure defined by the selected procedure information.

In still another aspect of the present invention, the foregoing object is attained by providing a recording apparatus comprising: reception means for receiving a broadcast wave and detecting image signals superposed on the broadcast wave; recording means for recording the image signals detected by the reception means on a storage medium; setting means for setting an extraction interval and extraction period of the image signals in accordance with the image signals recorded by the recording means, the setting means setting a changeable extraction interval; and extraction means for extracting a part of image signals from the image signals, recorded by the recording means, in accordance with the extraction interval and extraction period set by the setting means.

According to another aspect of the present invention, a recording method performed by the above recording apparatus is provided.

Further, according to another aspect of the present invention, a computer readable medium storing a control program for causing a computer to execute the above recording method is provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A to 2D are views showing data structures for the respective fields in digest video procedure information;

FIG. 3 is a view showing keywords for the respective fields and the structure of EPG information;

FIG. 9 is a view showing the data structure of "new 1" registered as new digest video procedure information by the above-described processing;

Figure 12:
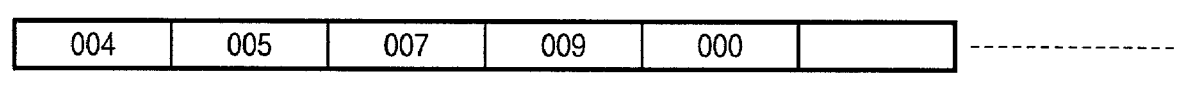

FIG. 12 is a view showing a registration example of cluster numbers of a digest video in a file having an extension "dyg";

FIG. 17 is a view showing the data structure of digest video procedure information according to the fourth embodiment;

FIG. 19 is a timing chart for explaining the digest capture timing in the fourth embodiment.

DETAILED DESCRIPTION OF THE PREFERRED EMBODIMENTS

Preferred embodiments of the present invention will now be described in detail in accordance with the accompanying drawings.

[First Embodiment]

In the first embodiment, a digest generation method by a video recording apparatus using a magnetic tape will be described.

Figure 1:
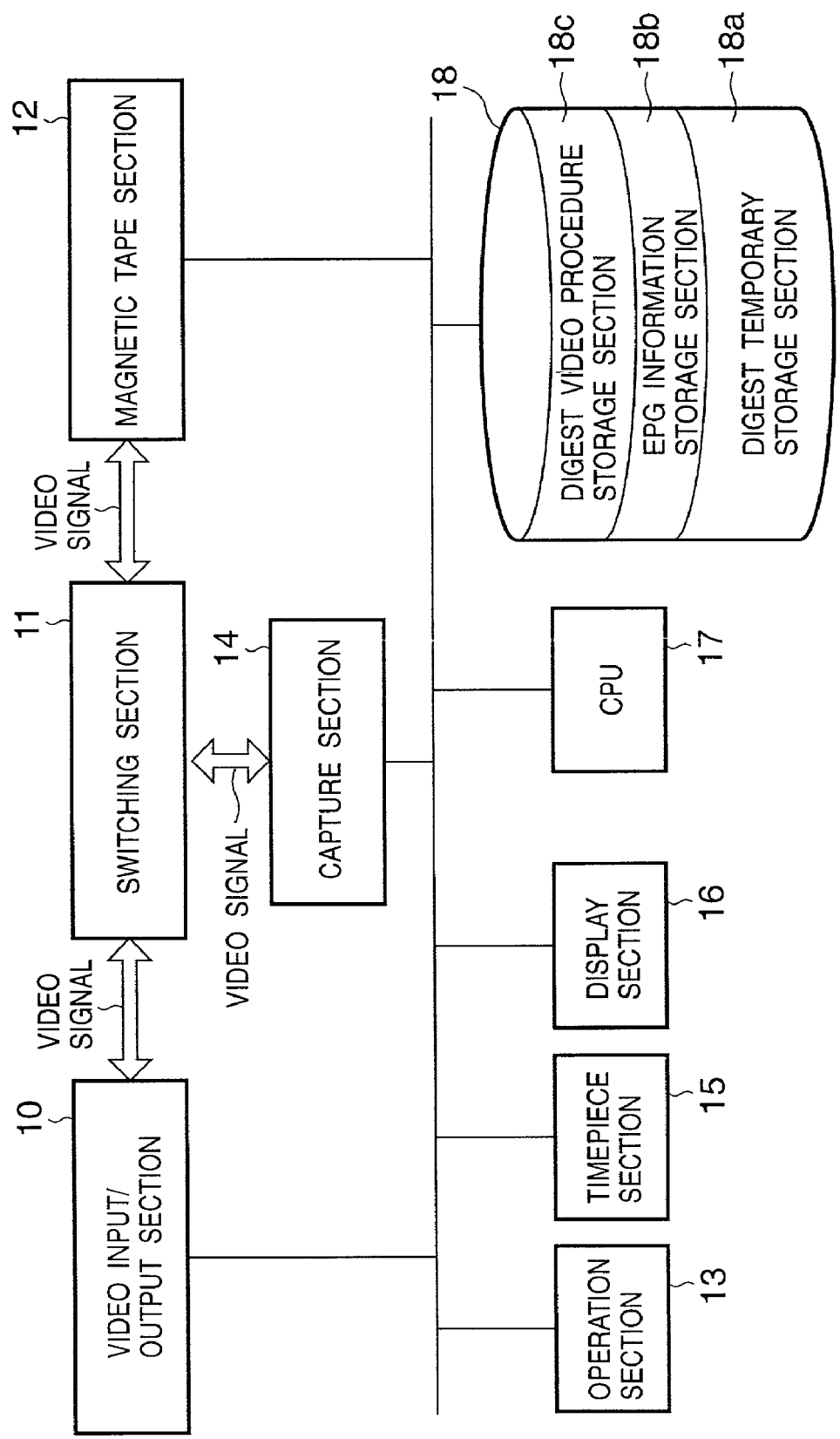
FIG. 1 is a block diagram showing the arrangement of a video recording apparatus according to the first embodiment.

FIG. 1 is a block diagram showing the arrangement of the video recording apparatus according to the first embodiment. Referring to FIG. 1, a video input/output section 10 having a tuner for receiving a broadcast wave generates and outputs video and audio signals from the received broadcast wave. The video and audio signals output from the video input/output section 10 are sent to a switching section 11. The switching section 11 controls the flow of signals in four modes in accordance with an instruction from a CPU 17.

The first mode is a digest generation mode. In this case, the output signals from the input/output section 10 are supplied to a magnetic tape section 12 and capture section 14 through the switching section 11. That is, in the first mode, digest data is generated on the basis of the video signal output from the video input/output section 10 and stored in a digest temporary storage section 18a.

The second mode is a write mode. In this case, the digest temporary storage data stored in the digest temporary storage section 18a of a storage section 18 is supplied to the magnetic tape 12 through the capture section 14 and switching section 11. That is, in the second mode, the digest data is recorded on the magnetic tape 12.

The third mode is a memory playback mode. In this case, the data stored in the digest temporary storage section 18a is supplied to the video input/output section 10 through the capture section 14 and switching section 11. That is, in the third mode, the digest data stored in the digest temporary storage section 18a is played back by the video input/output section 10.

The fourth mode is a tape playback mode. In this case, the output from the magnetic tape section 12 is supplied to the video input/output section 10 through the switching section 11. That is, in the fourth mode, the video recorded on the magnetic tape is played back by the video input/output section 10.

A digest video procedure storage section 18c of the storage section 18 stores digest video procedure information representing the digest video capture timing and capture length for each video field. FIGS. 2A to 2D are views showing data structures for the respective fields in the digest video procedure information. FIG. 2A shows digest video procedure information when the video content (field) is "movie". FIG. 2B shows digest video procedure information when the video content (field) is "documentary". FIG. 2C shows digest video procedure information when the video content (field) is "sports". FIG. 2D shows digest video procedure information when the video content (field) is "variety".

Keywords for the respective fields are also recorded in the pieces of digest video procedure information stored in the storage section 18. FIG. 3 is a view showing the keywords for the respective fields and the structure of EPG (Electronic Program Guide) information. An EPG information storage section 18b of the storage section 18 stores EPG information carried by the broadcast wave. In this embodiment, to generate a digest video from a received video, the field (movie, sports, or the like) of the received video is set. This setting can be done manually or automatically using the EPG information and keyword, as will be described later.

An operation section 13 has the operation panel of the recording apparatus and input switches capable of designating digest generation ON/OFF, video field, and time as well as input switches used for general operation such as playback, stop, and reservation for a magnetic tape. A timepiece section 15 has a timepiece function and counts time. A display section 16 displays a channel number, reservation time, digest video ON/OFF, video field, digest time, and the like.

Digest video generation in reserved picture recording of a movie program will be described below. When reserved picture recording and digest generation are instructed by operating the operation section 13, the CPU 17 instructs the switching section 11 to set the digest generation mode (first mode) in executing the reserved picture recording. For the descriptive convenience, in the initial state, a 160-min magnetic tape is set in the magnetic tape section 12 and rewound, and the tape counter is reset to 0:00:00.

Figure 4:
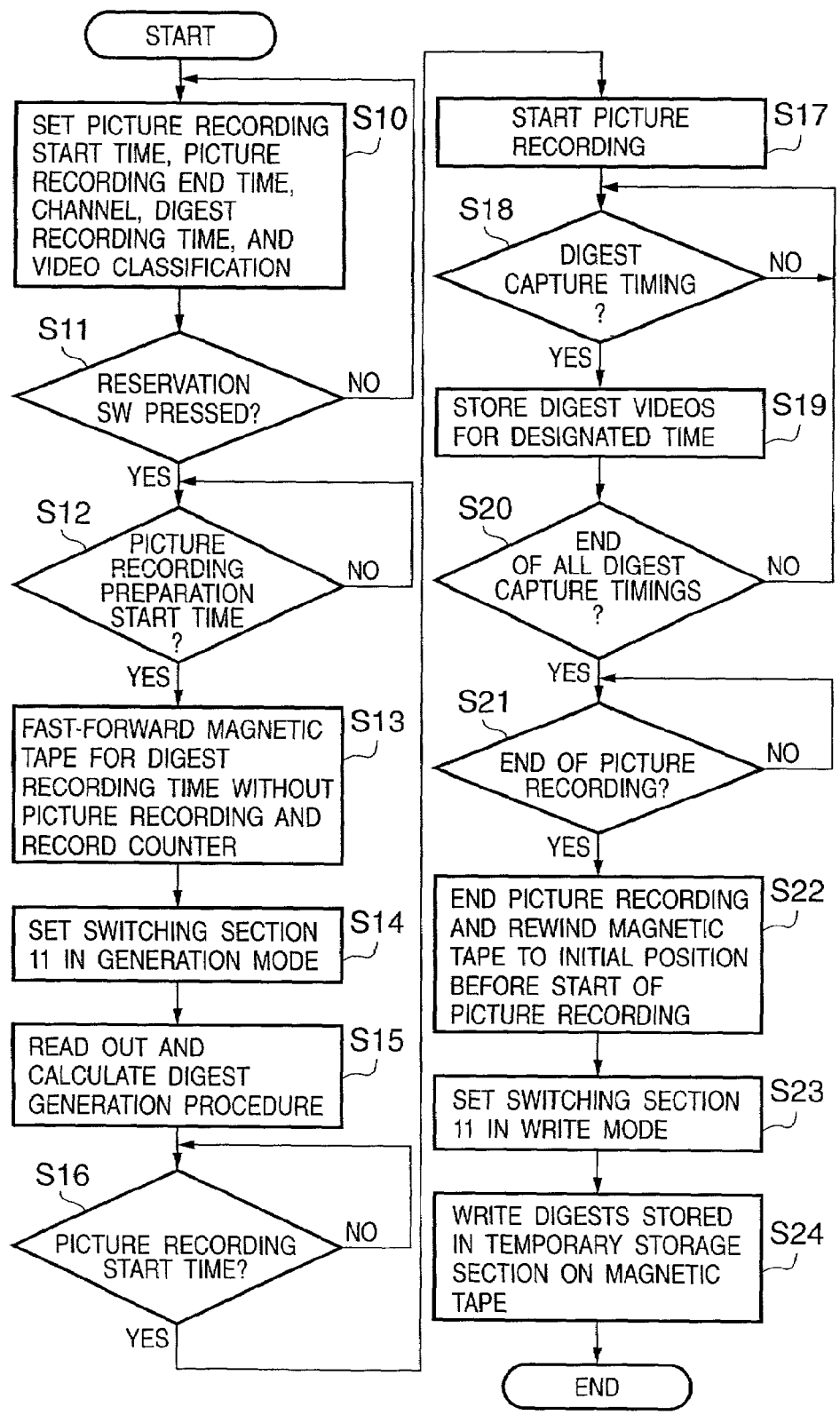
FIG. 4 is a flow chart for explaining picture recording processing in the digest generation mode according to the first embodiment.
Figure 5:
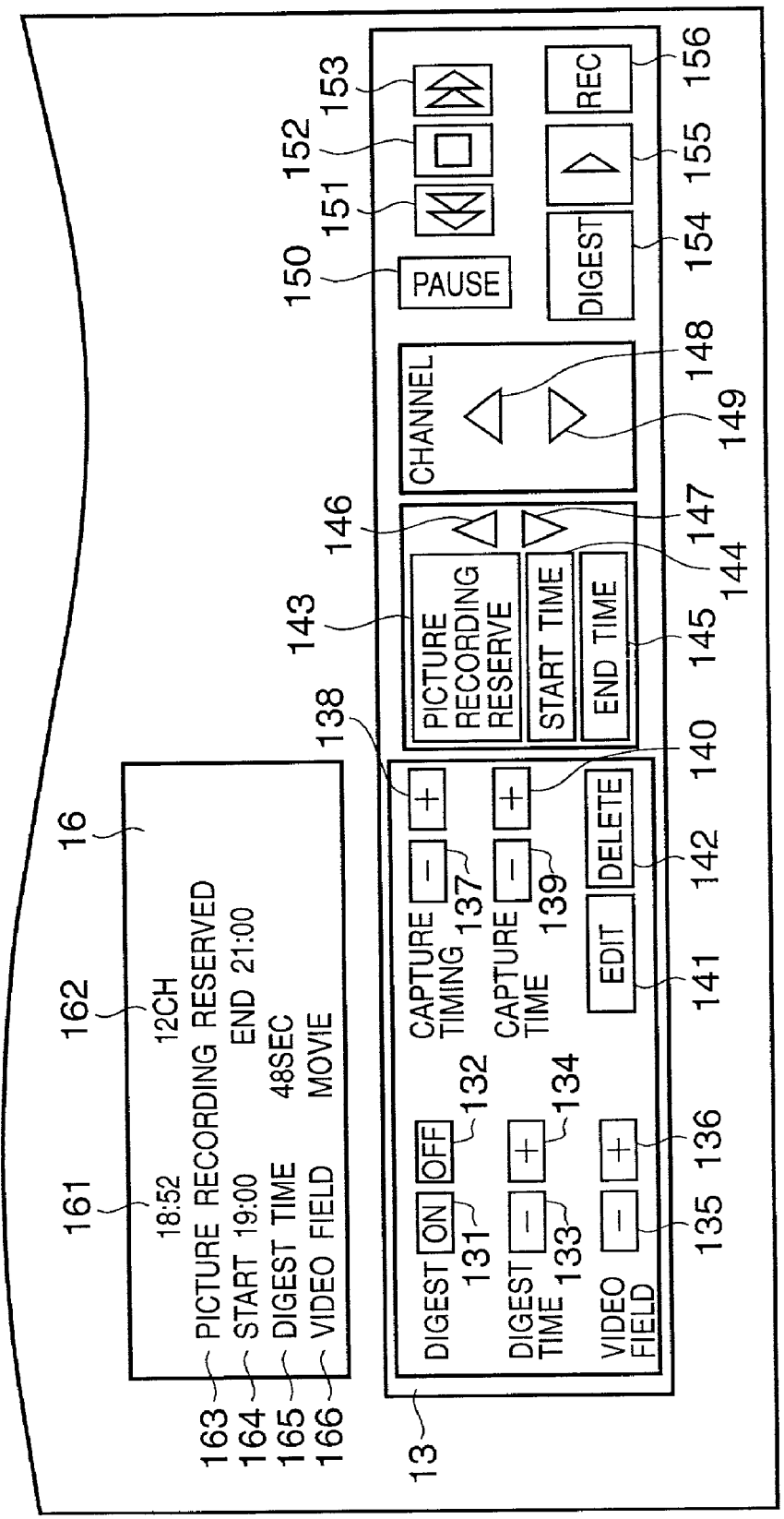
FIG. 5 is a view showing the operation panel of the video recording apparatus according to the first embodiment.

FIG. 4 is a flow chart for explaining picture recording processing in the digest generation mode according to the first embodiment. FIG. 5 is a view showing the operation panel of the video recording apparatus according to the first embodiment.

In step S10, the picture recording channel, picture recording start and end times, video classification (field), and digest video recording time are set. The setting is done using the operation panel shown in FIG. 5. For example, a channel (12CH in this example) to be recorded is selected by a switch (SW) 148 (channel number increment switch) or SW 149 (channel number decrement switch) of the operation section 13. Next, the picture recording start time is selected by an SW 144, and the picture recording start time (19:00 in this example) is set using an SW 146 (time increment switch) or SW 147 (time decrement switch). In a similar way, the picture recording end time is selected by an SW 145, and the picture recording end time (21:00 in this example) is set using the SW 146 (time increment switch) or SW 147 (time decrement switch).

Next, the mode for generating a digest (digest generation mode) is set by pressing an SW 131. In addition, the field of the video to be recorded is designated by an SW 136. In this case, every time the SW 136 is pressed, one of the fields ("movie", "documentary", "sports", and "variety" in this example) stored in the digest video procedure storage section 18c is displayed at a video field display position 166 in the display section 16. The SW 136 is repeatedly pressed until a desired field is displayed. In this example, "movie" is selected. When an SW 135 is pressed, the video fields are displayed in an order reverse to that when the SW 136 is pressed.

SWs 133 and 134 are used to designate the recording length of the digest video. Every time the SW 134 is pressed, the time displayed at a digest time display position 165 increases. When the SW 133 is pressed, the time displayed at the digest time display position 165 decreases. In this example, the digest time is set to 48 sec by operating the SWs 133 and 134.

Referring to FIG. 4, it is determined in step S11 whether a picture recording reservation SW 143 is pressed. When the picture recording reservation SW 143 is pressed, the flow advances to step S12 to execute processing for recording. That is, when predetermined settings for recording are done, and the picture recording reservation SW 143 is pressed, the flow advances to step S12 to execute picture recording processing.

In step S12, to ensure, on the magnetic tape, the recording area for the digest time of 48 sec set in step S10, a time necessary to fast-forward the tape corresponding to 48 sec is calculated, and the timing at which fast-forwarding should start is waited. At the fast-forwarding start time, the flow advances to step S13 to read and store the current counter value "0:00:00" and fast-forward the magnetic tape to the counter value "0:00:48" corresponding to the designated digest recording time of 48 sec. In this way, the recording area for the digest video corresponding to the set time (48 sec in this example) is ensured before the reserved picture recording start position on the magnetic tape.

In step S14, the switching section 11 is set in the digest generation mode. In the digest generation mode, the output from the video input/output section 10 is supplied to the magnetic tape 12 and capture section 14. In step S15, a digest video generation procedure corresponding to the video field input in step S10 is read out from the digest video procedure storage section 18c, and the digest video capture timing (actual time) is calculated from the picture recording time set in step S10.

In this example, since "movie" is selected as the video field, table values shown in FIG. 2A (field:movie, capture timing (%):0/5/7/10/17/27/35/52/65/75/85, capture time (sec):3/3/3/4/5/5/5/5/5/5/5) are read out. Each capture timing (%) represents a capture start timing as a percentage of the total picture recording period and is changed to an actual time. In this example, 1% corresponds to 72 sec because the picture recording time is set for 120 min from the picture recording start time 19:00 to the picture recording end time 21:00. Hence, for example, 0% represents the picture recording start time 19:00:00 (hour:minute:second), 5% represents 19:06:00, and 7% represents 19:08:24.

That is, when the composition shown in FIG. 2A (movie) is selected for picture recording for a recording time of 120 min, the capture timings are calculated in accordance with the actual time set for picture recording such that
 a video of 3 sec is captured from 19:00:00 (0%),
 a video of 3 sec is captured from 19:06:00 (5%),
 a video of 3 sec is captured from 19:08:24 (7%),
 a video of 4 sec is captured from 19:12:00 (10%),
 a video of 5 sec is captured from 19:20:24 (17%),
 a video of 5 sec is captured from 19:32:24 (27%),
 a video of 5 sec is captured from 19:42:00 (35%),
 a video of 5 sec is captured from 20:02:24 (52%),
 a video of 5 sec is captured from 20:18:00 (65%),
 a video of 5 sec is captured from 20:30:00 (75%), and
 a video of 5 sec is captured from 20:42:00 (85%).

The processing waits in step S16 until the picture recording start time. At the picture recording start time, the flow advances to step S17 to start picture recording on the magnetic tape.

It is determined in step S18 whether it is a digest video capture timing. At every digest video capture timing described above, the flow advances to step S19 to capture a video of a predetermined time from the capture section 14 (in this example, since the capture times shown in FIG. 2A are used, the predetermined time is 3, 4, or 5 sec) and store the captured video in the digest temporary storage section

18*a*. This processing is performed at all the above-described capture timings. For example, at 19:00:00, the flow advances to step S19 to capture a video of 3 sec from the capture section 14 and store the video in the digest temporary storage section 18*a*. It is determined in step S20 whether a capture timing still remains. If YES in step S20, the flow returns to step S18. At 19:06:00, the flow advances to step S19 again to capture a video of 3 sec from the capture section 14 and store the video in the digest temporary storage section 18*a*. When this processing is repeated at the above-described capture timings, a video of a total of 48 sec is stored in the digest temporary storage section 18*a* as a digest video.

When video capture for the digest video calculated in step S15 is completed, the flow advances from step S20 to S21 to monitor the picture recording end time. At the picture recording end time (21:00 in this example), the flow advances to step S22 to stop picture recording on the magnetic tape by the magnetic tape section 12, and the magnetic tape is rewound to the counter value 0:00:00 stored in step S13. In step S23, the switching section 11 is set in the write mode. As described above, when the write mode is set, the video data in the digest temporary storage section 18*a* is supplied to the magnetic tape section 12 through the capture section 14. In step S24, the digest video of 48 sec, which is stored in the digest temporary storage section 18*a*, is played back from the start. The digest video that has been played back is sent to the capture section 14, transmitted to the magnetic tape section 12 through the switching section 11, and recorded on the magnetic tape. When playback and recording of the digest video of 48 sec are ended, playback from the digest temporary storage section 18*a* and picture recording on the magnetic tape section 12 are stopped and ended.

In this way, the movie program reserved for picture recording can be recorded on the magnetic tape, and the digest video can be recorded before the recording start position of the program. For this reason, the user can grasp the contents of the video recorded after the digest video by watching the digest video and properly determine whether the recorded contents should be watched.

The digest video procedure information for the respective fields shown in FIGS. 2A to 2D will be described in more detail. As shown in FIG., 2A, weighting on the time axis is performed for the digest capture timings in the "movie" field, and the weighting on the time axis is performed for the capture times, too. The weighting on the time axis is rarely done in the "documentary" field, as shown in FIG. 2B. In the "sports" field, the capture time for one capture timing is short, though the number of times of capture is large, as shown in FIG. 2C. In the "variety" field, the weighting on the time axis is rarely done for the capture timings, as shown in FIG. 2D. However, the capture times at the first half are weighted more than at the second half.

In the above description, the digest time is set to 48 sec. Another time may be set, as a matter of course. For example, when the digest time is 72 sec, the capture time at each capture timing (%) is increased to 1.5 times (72/48=1.5). When the digest time is 24 sec, the capture time at each capture timing (%) is decreased to 0.5 times (24/48=0.5).

In the above description, the pieces of digest video procedure information are stored in advance. Apparently, the digest video procedure information may be adjusted in accordance with the user's taste. Alternatively, a desired digest video procedure may be created. When the digest video procedure information can be adjusted or newly created, a more appropriate digest recording procedure corresponding to the user's taste can be used. A case wherein a digest video procedure is to be edited or newly created will be described below with reference to the flow chart shown in FIG. 7. An example of edit operation will be described below, in which the latter half of default capture timings set in the "movie" field as shown in FIG., 2A is deleted, and more capture timings are set for the intermediate portion.

Figure 6:
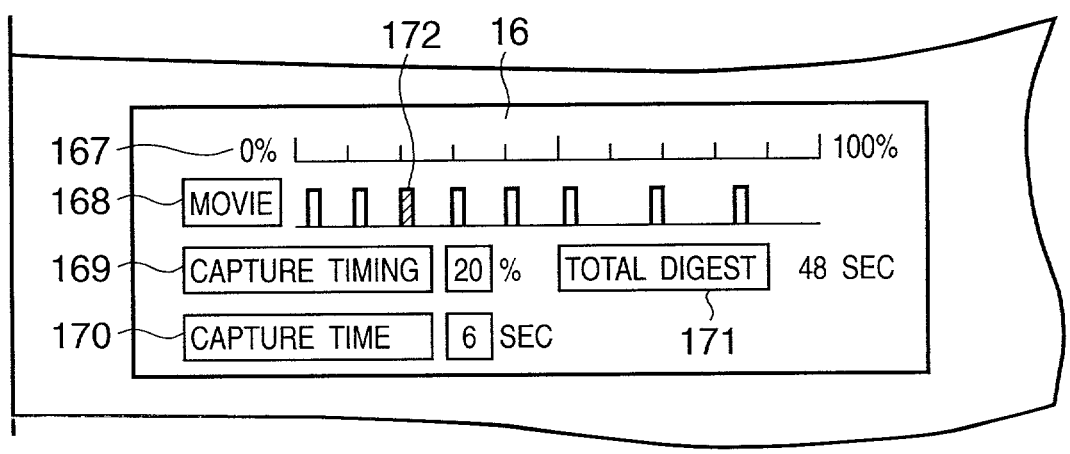
FIG. 6 is a view showing a display example of an edit window according to the first embodiment (display contents in editing the digest video procedure information on a display section 16 shown in FIG. 5)
Figure 7:
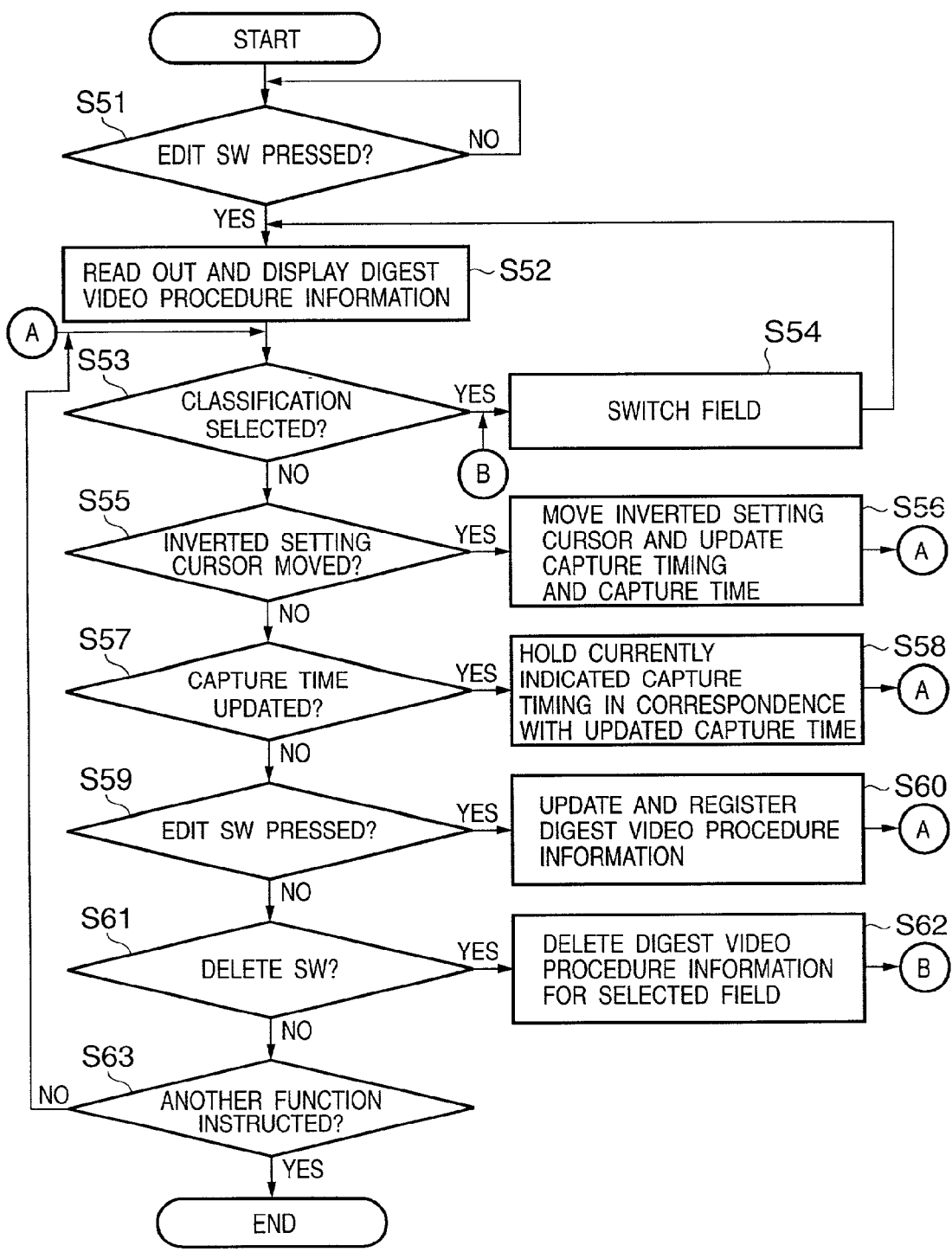
FIG. 7 is a flow chart for explaining digest video procedure edit processing.

First, an edit SW 141 shown in FIG. 5 is pressed whereby digest video procedure information corresponding to the currently set field ("movie" in this example) is read out from the digest video procedure storage section 18*c* and held in the temporary storage memory (not shown), and the contents are displayed on the display section 16 (steps S51 and S52 in FIG. 7). FIG. 6 is a view showing a display example of the edit window at this time (display contents in editing the digest video procedure information on the display section 16 shown in FIG. 5). As shown in FIG. 6, a scale 167 that represents the recording video length as 100% is displayed at the uppermost portion of the display section 16. A field indicator 168 is displayed on the lower side to display the currently set video field ("movie" in this example). In addition, the currently set capture timing is represented by a graph corresponding to the scale 167 (referring to FIG. 6, each bar position of the bar graph indicates a capture timing, and the width of the bar is proportional to the capture time, though when the bar width is less than the resolution of the display section 16, the width is indicated by one dot). On the lower side, "capture timing, 20%" is displayed as a capture timing indicator 169, and on its side, the total capture time, i.e., "digest total, 48 sec" is displayed as a capture time indicator 171. At the lowermost position, "capture time, 6 sec" is displayed as a capture time indicator 170.

In this state, the classification can also be switched (step S53 and S54). That is, when the video classification SW 136 is pressed, already registered fields ("movie", "documentary", "sports", and "variety", and "create new 1" in which nothing is registered yet" are sequentially displayed. Assume that the video classification SW 136 or 135 is pressed until "movie" is displayed. When the SW 135 is pressed, the registered fields are displayed in the reverse order. When the classification is changed, pieces of digest video procedure information corresponding to the changed classification are read out in step S52, and the contents are displayed, as described above.

When "movie" is selected, and the pieces of digest video procedure information corresponding to this field are displayed, the set capture timings are "0%", "5%", "7%", "10%", "17%", "27%", "35%", "52%", "65%", "75%", and "85%", and the capture times are "3 sec", "3 sec", "3 sec", "4 sec", "5 sec", "5 sec", "15 sec", "5 sec", "5 sec", "5 sec", and "5 sec" (FIG. 2A). The procedure of changing the digest video procedure information will be described here by exemplifying a case wherein the set contents are changed to capture timings "0%", "5%", "7%", "10%", "14%", "17%", "21%", "27%", "35%", "52%", "65%" and capture times "3 sec", "3 sec", "4 sec", "4 sec", "4 sec", "5 sec", "5 sec", "5 sec", "5 sec", "5 sec", "5 sec".

An inverted setting cursor 172 is displayed on the graph on a side of the field indicator 168. The inverted setting cursor 172 can be moved to the left or right by a capture timing SW 137 or 138. That is, every time the capture timing SW 137 is pressed, the inverted setting cursor 172 is moved in the 0% direction, and every time the capture timing SW 138 is pressed, the inverted setting cursor 172 is moved in the 100% direction. As the inverted setting cursor 172 moves, a percentage represented by the cursor position is displayed at the position of the capture timing indicator 169, and the capture time at that percentage is displayed at the position of the capture time indicator 170 (steps S55 and S56). Capture time "0" sec is displayed at an unset percentage.

With the above operation, the inverted setting cursor 172 is moved to the desired capture timing, and then, the capture time is updated using a capture time SW 139 or 140, thereby updating the capture time at that capture timing. The digest video procedure information stored in the temporary storage memory is updated based on this correspondence (steps S57 and S58).

For example, when the inverted setting cursor 172 is moved to the first correction position "7%" using the SW 137 or 138, "3 sec" is displayed at the position of the capture time indicator 170. The SW 140 is pressed to change the capture time "4 sec". If the capture time becomes too long, it can be shortened by the SW 139. When the inverted setting cursor 172 is moved, the capture timing "7%" and capture time "4 sec" are made to correspond to each other. On the basis of this correspondence, the digest video procedure information held in the temporary storage memory is updated. When the inverted setting cursor 172 is moved to the next correction position "14%" by the SW 137 or 138, "0 sec" is displayed at the position of the capture time indicator 170. The SW 140 is pressed to change the capture time to "4 sec". If the time becomes too long, it is shortened by the SW 139.

When the cursor is moved to the next correction position "21%" by the SW 137 or 138, "0 sec" is displayed at the position of the capture time indicator 170. The SW 140 is pressed to change the capture time to "5 sec". If the time becomes too long, it is shortened by the SW 139. When the cursor is moved to the next correction position "75%" by the SW 137 or 138, "5 sec" is displayed at the position of the capture time indicator 170. The capture time is decreased to "0 sec" by the SW 139. When the cursor is moved to the next correction position "85%" by the SW 137 or 138, "5 sec" is displayed at the position of the capture time indicator 170. The capture time is decreased to "0 sec" by the SW 139.

On the capture timing graph displayed on a side of the field indicator 168, when the capture time is updated to "0", a corresponding bar is erased (each bar position of the bar graph indicates a capture timing, and the width is proportional to the capture time). When a new capture timing is set, a bar having a width corresponding to the set capture time is displayed at a corresponding position on the bar graph. Finally, the edit SW 141 is pressed whereby the digest procedure re-set on the temporary storage memory by the series of operations is written and stored in the digest video procedure storage section 18*c* (steps S59 and S60).

A case wherein new digest video procedure information is created will be described. When the edit SW 141 is pressed, and then the video classification SW 136 is pressed, "new 1" in which nothing is registered yet is displayed next to the already registered fields "movie", "documentary", "sports", and "variety") (steps S51 to S54). When "new 1" is displayed, the video classification SW 136 is released. A case wherein digest video procedure information containing, e.g., capture timings "0%", "10%", "20%", "30%", "40%", and "50%" and capture times "4 sec", "4 sec", "4 sec", "4 sec", "4 sec", and "4 sec" is created will be described. In this case, first, the inverted setting cursor 172 is moved to the position "0%" by operating the SW 137 or 138. Since "0 sec" is displayed at the position of the capture time indicator 170, the capture time indicator 170 is changed to "4 sec" by operating the SW 140 or 139 (steps S55 to S58). Subsequently, the inverted setting cursor 172 is moved to the position "10%" by the SW 137 or 138, and the capture time indicator 170 is changed to "4 sec" by operating the SW 140 or 139. The same operation is repeated for capture timings "20%", "30%", "40%", and "50%". When all settings are input, the edit SW 141 is pressed, thereby additionally registering the field named "new 1" in the digest video procedure storage section 18*c* (steps S59 and S60). A desired field name may be set.

Figure 8:
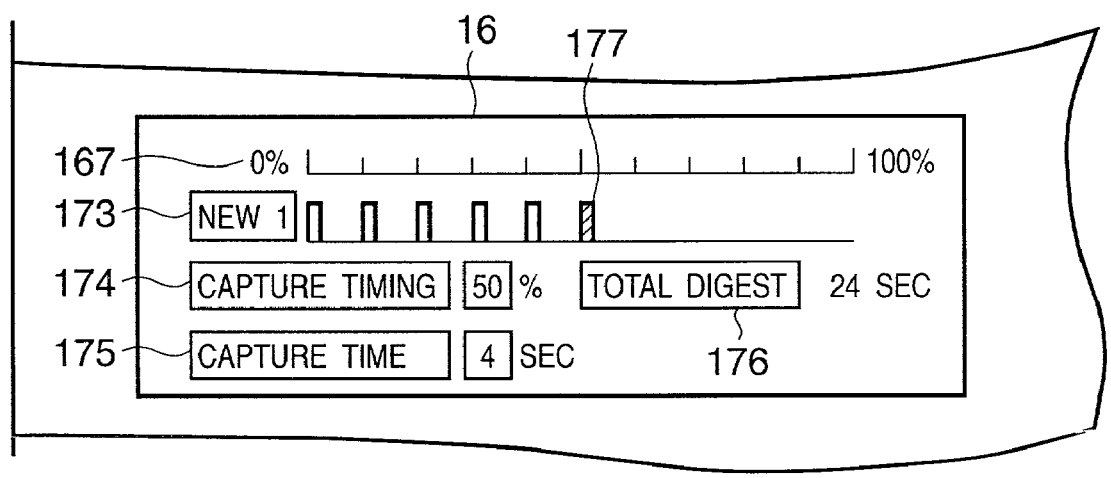
FIG. 8 is a view showing the display state in the edit mode for registering new digest video procedure information named "new 1"

FIG. 8 is a view showing the display state in the edit mode for registering new digest video procedure information named "new 1". Pieces of new digest video procedure information can be added as "new 2", . . . "new n". Not "new n" but an arbitrary name may be input by adding a key input device. FIG. 9 is a view showing the data structure of "new 1" registered as the new digest video procedure information by the above-described processing.

To delete digest video procedure information, the edit SW 141 is pressed to set the edit mode, the video classification to be deleted, e.g., "new 1" is displayed at the position of the video classification indicator 168 by the SW 136 or 135, and a delete SW 142 is pressed (steps S61 and S62). Pieces of information for the classification registered next are displayed at the positions of the video classification indicator 168, capture timing indicator 169, capture time indicator 170, and digest total indicator 171 (steps S54 and S52). To prevent cancel by erroneous operation, the digest video procedure information may be protected by storing the default procedure in the ROM or only setting a delete flag without deleting the procedure.

The edit operation shown in FIG. 7 is ended when execution of another function is instructed (step S63).

In the above description, the field of the program to be recorded is displayed using the video classification SW 135. If EPG information is used, the field may be automatically discriminated. This processing will be described with reference to FIG. 3.

EPG information carried by the broadcast wave is decoded by the capture section 14, and pieces of information including the broadcast identification number, start time, duration, program name, description, and genre of broadcast content are stored in the EPG information storage section 18*b* of the storage section 18. A first stage of content identification (genre 1) 207 for the program, which is set by SW input on the operation section 13 and stored in the EPG information storage section 18*b* on the basis of the channel to be recorded and picture recording time, is read out, and searching is executing for the video field and each of keywords 200 on the keyword table, which are stored in the digest video procedure storage section 18*c*. If a keyword that matches the first stage of content identification (genre 1) 207 is detected, the field is determined as a field corresponding to the keyword shown in FIG. 3, the procedure for the field is read out from the digest video procedure storage section, and a digest video is generated in accordance with the procedure.

For example, assume that a genre "music" is sent as the first stage of content identification (genre 1) 207. Searching is sequentially executed for the keywords 200. Since the keyword "music" is written in the table 200 in correspondence with the field "documentary", the digest video procedure for the field "documentary" is read out from the digest video procedure storage section 18*c*, and a digest video is generated in accordance with the procedure (capture timing and capture time). If no keyword that matches the first stage of content identification (genre 1) 207 is detected, a second stage of content identification (genre 2) 208 is searched for. If no keyword is detected yet, a program name 204 is searched for. If no keyword is detected yet, a program description 205 is searched for. If no keyword is detected yet, extension information 206 is searched for. If no keyword is detected yet, it is determined that no corresponding keyword 200 is detected, and the field "documentary" is selected (the descriptions of the content and extension event are arbitrary information, and are not always contained in the EPG information of some programs).

When no EPG information is present, or the user wants to record the program in accordance with settings for another field different from that represented by the EPG information, the procedure can be manually set by the video classification SW-135. The association between the digest procedure fields and keywords is a mere example, and the settings may be changed as needed.

When pieces of EPG information are displayed on the display device 16 time-serially or for each genre, the cumbersome setting procedure shown in step S10 can be simplified, and the program to be recorded can more easily be selected.

In the above embodiment, the digest video capture timing and time are set for each video field. A digest image may be generated by combining the above method with a method of detecting the degree of change in window from the luminance and chrominance signals of the image and capturing a portion with a large change in scene as a digest video.

For example, videos of 3, 3, 2, and 2 sec are captured at capture timings "20%", "40%", "60%", and "80%", and when capture timings "0% to 19%", "21% to 39%", "41% to 59%", "61% to 79%", and "81% to 100%" are set, videos of 3, 3, 3, 2, and 2 sec are captured mainly at a position with the largest number of times of scene change at each capture timing. This procedure can easily be adapted to a video field for which the video to be watched is hard to expect because scenes at predetermined timings and scenes with many scene changes are captured as a digest video.

[Second Embodiment]

In the first embodiment, a digest video is recorded on a magnetic tape. In the second embodiment, a random-accessible digital recording medium is used as a storage medium.

Figure 10:
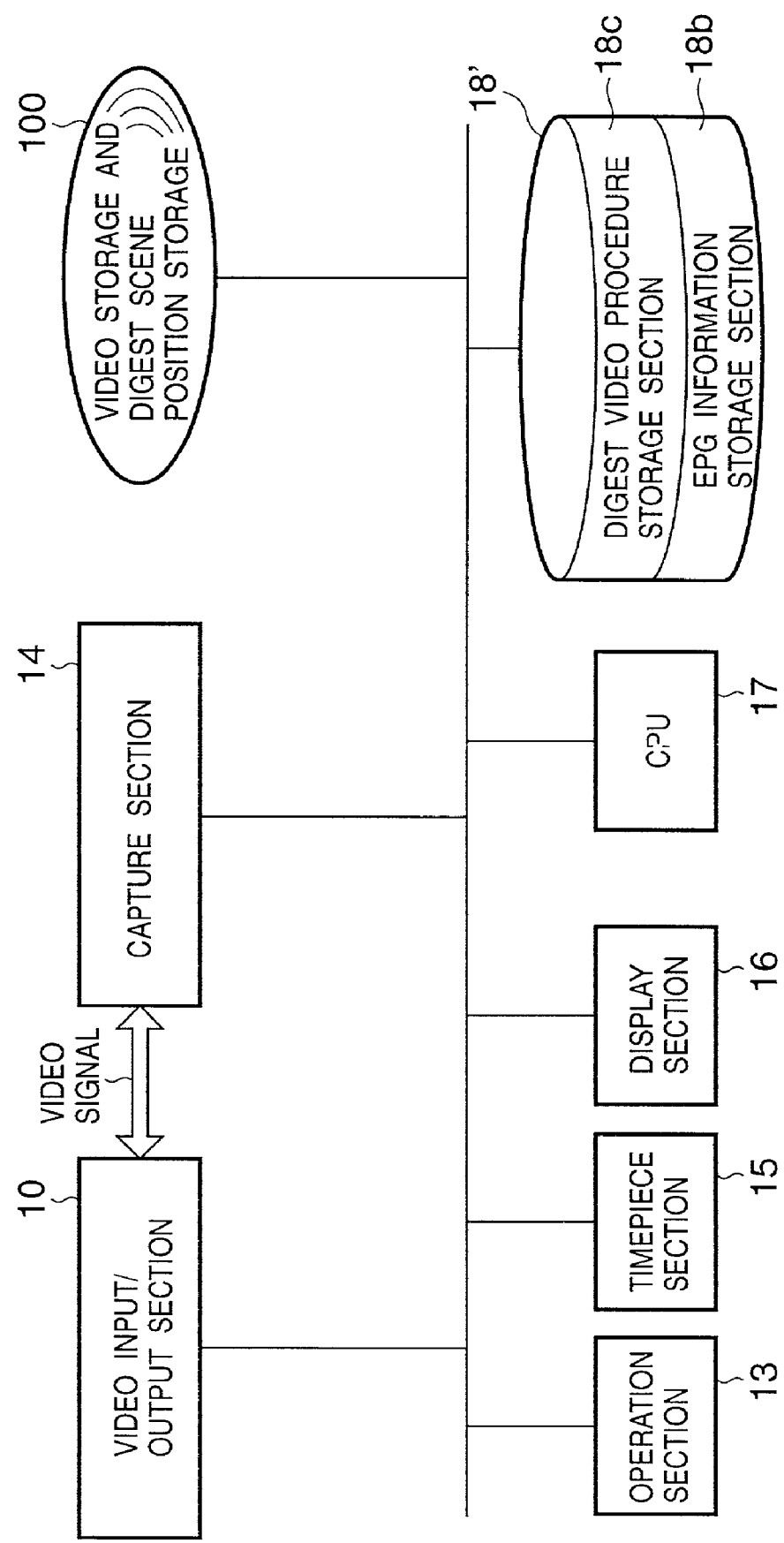
FIG. 10 is a block diagram showing the arrangement of a video recording apparatus according to the second embodiment.

FIG. 10 is a block diagram showing the arrangement of a video recording apparatus according to the second embodiment. The same reference numerals as in the first embodiment (FIG. 1) denote the same components in FIG. 10, and a detailed description thereof will be omitted here. In the second embodiment, a video input/output section 10 is connected to a capture section 14, and a switching section 11 is omitted. A digital storage medium 100 stores the addresses of a video and a video to be played back as a digest. A storage section 18' has a digest video procedure storage section 18c and EPG information storage section 18b, and a digest temporary storage section 18a is omitted.

Parts different from the first embodiment will be described below. When a magnetic tape is used, the tape is wound before the start of picture recording to ensure a digest video recording area, and finally rewound to record the digest video. This processing is unnecessary in the second embodiment because video data is random-accessible. A video recording procedure with digest video generation according to the second embodiment will be described below with reference to FIGS. 11 to 13.

Figure 13:
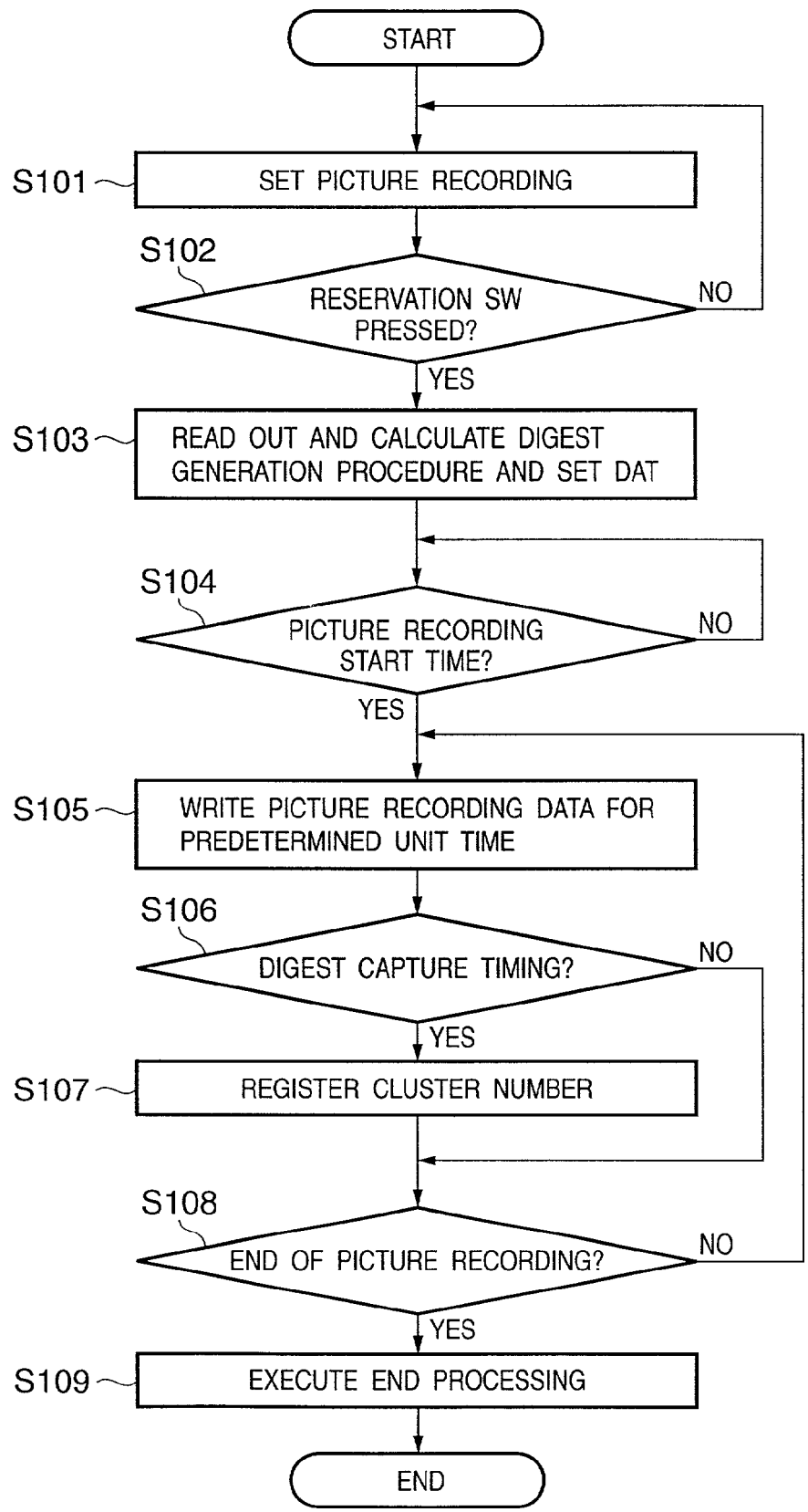
FIG. 13 is a flow chart for explaining a video recording procedure with digest video generation according to the second embodiment.

FIG. 13 is a flow chart for explaining a video recording procedure with digest video generation according to the second embodiment. In step S101, necessary setting is done. The setting method is the same as described in step S10 of FIG. 4. After the necessary setting is ended, a picture recording reservation SW 143 is pressed, and the flow advances from step S102 to S103. For the descriptive convenience, the following contents are set. The picture recording time is 10 sec, and the digest procedure is set to capture videos of 2, 1, 1, and 1 sec at capture timings "0%" "30%", "50%", and "80%".

Figure 11:
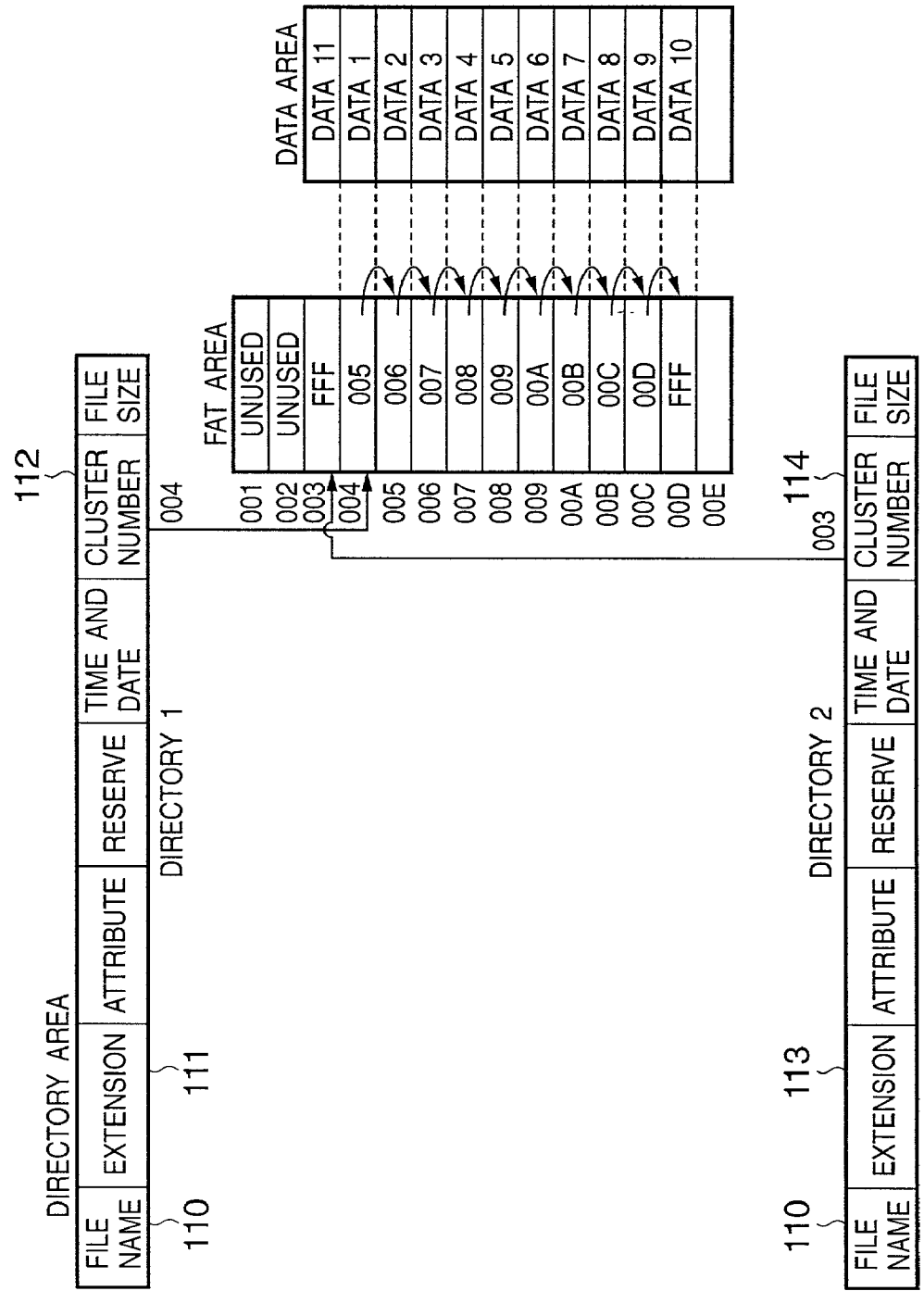
FIG. 11 is a view showing the file structure of a digital storage medium 100 in the second embodiment.

In step S103, the above-described digest procedure is read out, and the actual time in which the digest video is to be held is calculated from the set picture recording time. In this example, since the picture recording time is 10 sec, videos of 2, 1, 1, and 1 sec at timings of 0, 3, 5, and 8 sec are used as a digest video. In step S103, FAT (File Allocation Table) is set for picture recording. The file structure of the digital storage medium 100 is formatted as shown in FIG. 11. The entries of FAT and clusters of the data area are in a one-to-one correspondence. Each cluster of the data area has a size for recording a video of 1 sec. Before the start of picture recording, digest "ON" is set. Hence, an extension "dyg" representing a digest data file is written in an extension 113 of directory 2, and the first FAT entry of digest data (cluster number "003" in this example) is written in a cluster number 114. Additionally, an extension "vdo" representing a picture recording data file is written in an extension 111 of directory 1, and the first FAT entry of picture recording data file (cluster number "004" in this example) is written in a cluster number 112. That is, the first FAT entry of the picture recording data file (extension "vdo") is registered in directory 1 and a cluster chain is formed starting from the FAT entry in the FAT area. The first FAT entry of the file (extension "dyg") in which the cluster for a digest video is registered is registered in directory 2.

In step S104, the picture recording start time is waited. At the picture recording start time, picture recording and digest video recording are performed in steps S105 to S108. In step S105, picture recording data of a predetermined unit time (1 sec in this example) is written, and its cluster number is registered in the FAT. In step S106, it is determined whether it is a digest capture timing. If YES in step S106, the cluster number is written in the digest data area (data 11) in step S107. The above processing is repeated until the picture recording is ended (step S108).

The operation of the picture recording apparatus will be described in more detail in accordance with the above settings. At the picture recording timing "0 sec", "data 1 " as picture recording data of 1 sec is written from cluster 004 (step S105). Since the video from 0 to 1 sec is designated as a digest video, the cluster number with the written data is written in "data 11" (steps S106 and S107). In this way, data (cluster numbers) for generating the digest video are written in data 11.

At the picture recording timing "1 sec", "005" is written in the area of FAT entry 004, the write of picture recording "data 2" of 1 to 2 sec in cluster 005 is started (step S105), and the cluster number with the written data is additionally written in "data 11" (steps S106 and S107). At the picture recording timing "2 sec", "006" is written in the area of FAT entry 005, and the write of picture recording "data 3" of 2 to 3 sec in cluster 006 is started (step S105). Since the video at this timing is not used for the digest, the cluster number is not registered in data 11 (step S106).

The following processing is executed in the same way as described above.

At the picture recording timing "3 sec", "007" is written in the area of FAT entry 006, the write of picture recording "data 4" of 3 to 4 sec in cluster 007 is started, and the cluster number with this written data is additionally written in "data 11".

At the picture recording timing "4 sec", "008" is written in the area of FAT entry 007, and the write of picture recording "data 5" of 4 to 5 sec in cluster 008 is started.

At the picture recording timing "5 sec", "009" is written in the area of FAT entry 008, the write of picture recording "data 6" of 5 to 6 sec in cluster 009 is started, and the cluster number with this written data is additionally written in "data 11".

At the picture recording timing "6 sec", "00A" is written in the area of FAT entry 009, and the write of picture recording "data 7" of 6 to 7 sec in cluster 00A is started.

At the picture recording timing "7 sec", "00B" is written in the area of FAT entry 00A, and the write of picture recording "data 8" of 7 to 8 sec in cluster 00B is started.

At the picture recording timing "8 sec", "00C" is written in the area of FAT entry 00B, the write of picture recording "data 9" of 8 to 9 sec in cluster 00C is started, and the cluster number with this written data is additionally written in "data 11". At this timing, "FFF" is written in FAT entry 003 because digest capture will not be executed anymore.

At the picture recording timing "9 sec", "00D" is written in the area of FAT entry 00C, and the write of picture recording "data 10" of 9 to 10 sec in cluster 00D is started.

At the picture recording timing "10 sec", since the picture recording is ended, "FFF" is written in the area of FAT entry 00D (steps S108 and S109).

The extension "vdo" of the file name represents a recorded program which is chained as data 1 to 10 in the FAT area. On the other hand, the file represented by the extension "dyg" stores the cluster numbers of videos to be played back as a digest video, as shown in FIG., 12. When data 1, data 2, data 4, data 6, and data 9 at the cluster numbers "004", "005", "007", "009", and "00C" are played back, the data can be played back as a digest video. When "FFF" in the FAT entry is detected, a corresponding cluster is read out, and the processing is ended.

In the above description, a cluster number is written in the digital recording medium 100 at each digest video capture timing. The cluster numbers may be stored in the CPU during picture recording and written when the picture recording is ended. Picture recording for a period as short as 10 sec has been described above. However, even for a longer time or even for compressed data, a digest can be generated and played back.

[Third Embodiment]

In the second embodiment, addresses at which digest videos are stored are written in the digital recording medium and used to play back the digest videos. When the storage medium as in the second embodiment is used, the picture recording time per cluster is predetermined. For this reason, even when a medium in which no digest playback address is written is to be played back, the digest video can be played back. That is, the position (cluster) for digest playback can be calculated from the length of the recorded video, and the digest can be played back by designating the field of the digest procedure stored in a storage section 101.

For example, the digest video procedure information for "movie" shown in FIG. 2a is selected. In this procedure information, capture times "3 sec", "3 sec", "3 sec", "4 sec", "5 sec", "5 sec", "5 sec", "5 sec", "5 sec", "5 sec", and "5 sec" are set for capture timings "0%", "5%", "7%", "10%", "17%", "27%", "35%", "52%", "65%", "75%", and "85%", respectively. Hence, if the time of the video to be played back is calculated as 2 hrs, in playing back the digest video, a video is played back for 3 sec from 0:00:00,
a video is played back for 3 sec from 0:06:00,
a video is played back for 3 sec from 0:08:24,
a video is played back for 4 sec from 0:12:00,
a video is played back for 5 sec from 0:20:24,
a video is played back for 5 sec from 0:32:24,
a video is played back for 5 sec from 0:42:24,
a video is played back for 5 sec from 1:02:24,
a video is played back for 5 sec from 1:18:00,
a video is played back for 5 sec from 1:30:00, and
a video is played back for 5 sec from 1:42:00. When the cluster numbers corresponding to the videos at the above timings are obtained, and the videos are sequentially played back, the digest video can be played back, or even when no addresses are recorded for the digest video, the digest video can be played back.

[Fourth Embodiment]

In the above-described first to third embodiments, the digest video is played back using videos of the set capture times at the set capture timings. In watching the digest video, obviously, the presentation is improved by playing back audio data as well as video data, and the contents can easily be checked. In the above embodiments, however, the digest video is extracted in accordance with the set capture times. For this reason, even when the audio data is played back together with the video data, words that are played back are unnatural, and no appropriate digest with audio data can be obtained. In the fourth embodiment, punctuation in audio data is detected to determine a digest video (with audio data), thereby playing back a more natural digest video with audio data.

Figure 14:
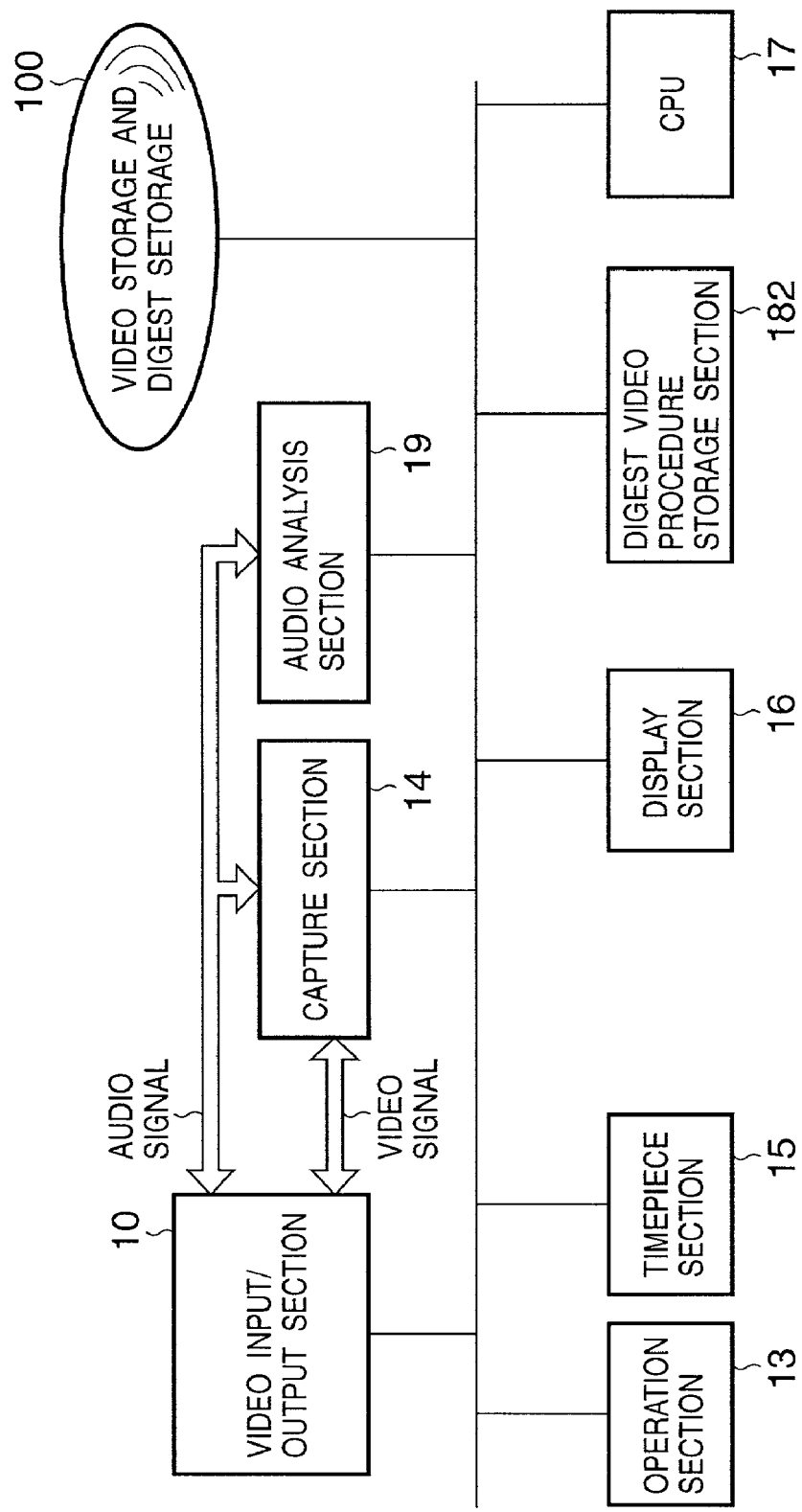
FIG. 14 is a block diagram showing the arrangement of a video recording apparatus according to the fourth embodiment.

FIG. 14 is a block diagram showing the arrangement of a video recording apparatus according to the fourth embodiment. The same reference numerals as in the first embodiment (FIG. 1) or second embodiment (FIG. 10) denote the same components in FIG. 14, and a detailed description thereof will be omitted here. In the fourth embodiment, a video input/output section 10 and capture section 14 process video and audio signals. Analog video and audio signals output from the input/output section 10 are input to the capture section 14. The input analog video and audio data are converted into digital data by an A/D converter. The audio signal is also output to an audio analysis section 19. The audio analysis section 19 detects punctuation in words and notifies a CPU 17 of the detection result. A digital storage medium 100 stores not only the digital video and audio data captured and recorded by the capture section 14 but also digest video and audio data.

Figure 15:
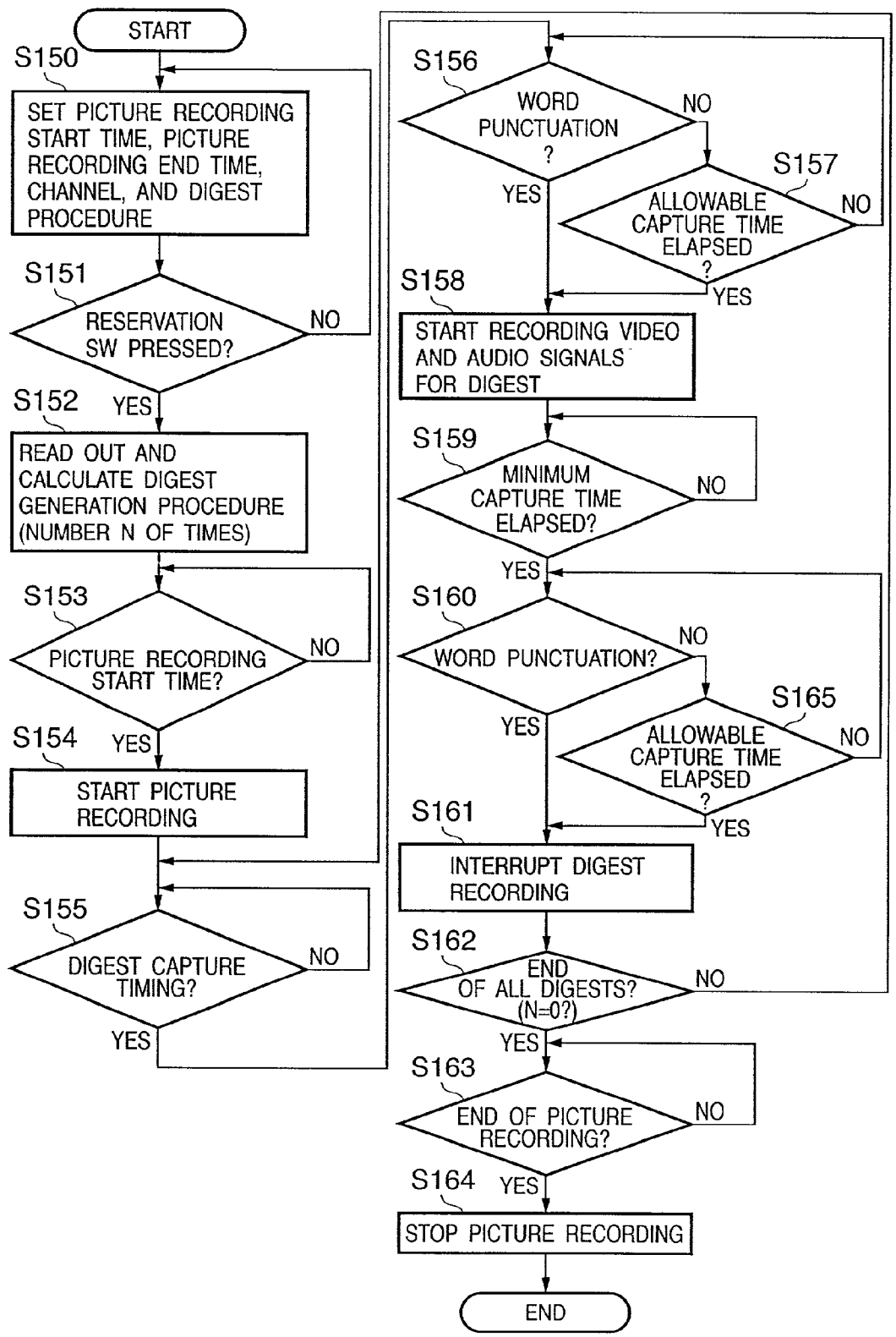
FIG. 15 is a flow chart showing a procedure of generating a digest video with audio data in the fourth embodiment.
Figure 16:
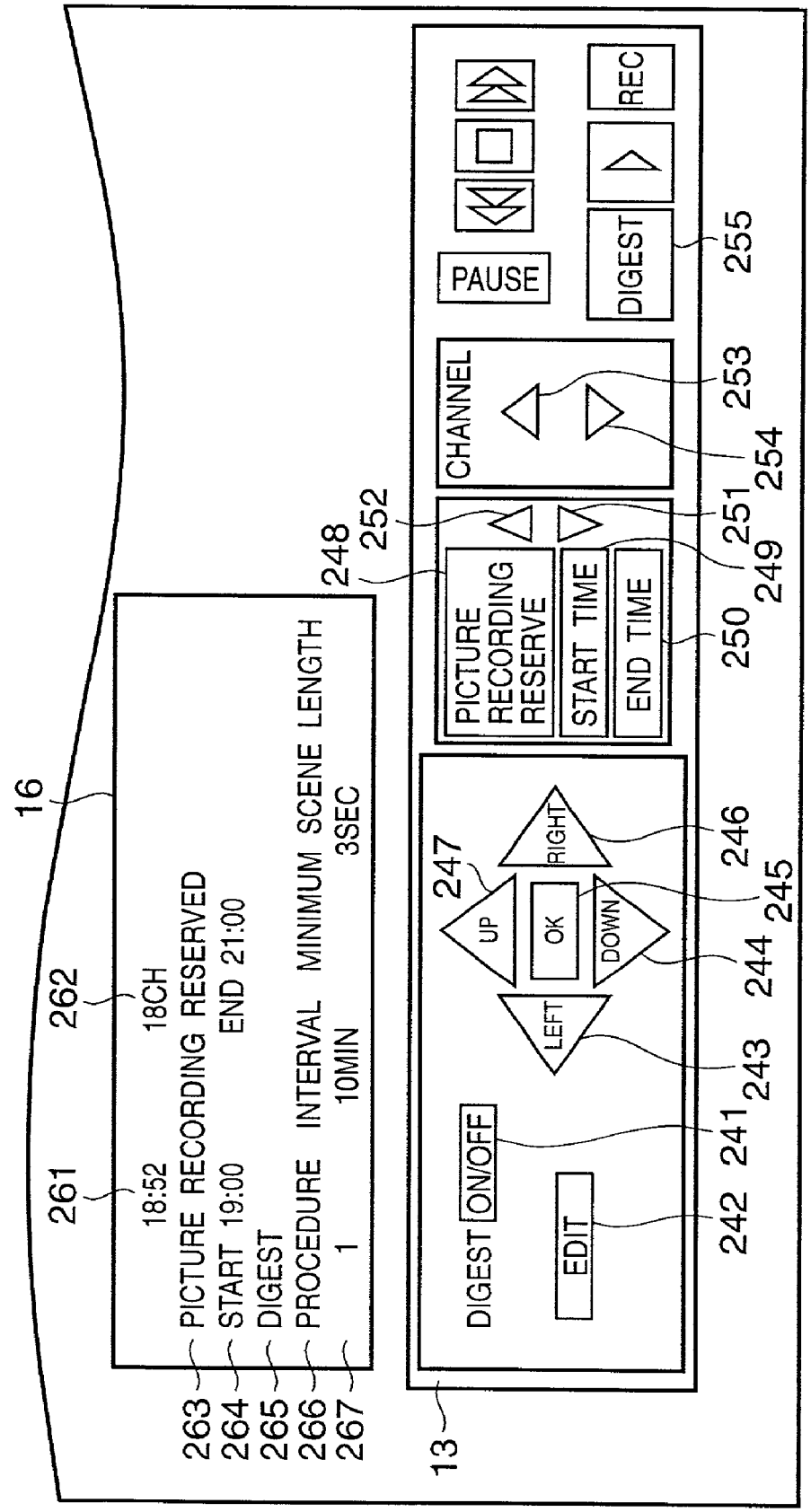
FIG. 16 is a view showing the operation section and display section of the video recording apparatus according to the fourth embodiment.

The operation of the video recording apparatus according to the fourth embodiment having the above arrangement will be described. A procedure of recording a documentary TV program for 1 hr by reserved picture recording and generating a digest video with audio data will be described. FIG. 15 is a flow chart showing the procedure of generating a digest video with audio data in the fourth embodiment. FIG. 16 is a view showing the operation section and display section of the video recording apparatus according to the fourth embodiment.

In step S150, setting for reserved picture recording is done. More specifically, a desired picture recording channel (12CH in this example) is selected by an SW 253 (channel number increment switch) or SW 254 (channel number decrement switch) of an operation section 13. Next, the picture recording start time is selected by an SW 249, and a desired picture recording start time (17:00 in this example) is set using an SW 252 (time increment switch) or SW 251

(time decrement switch). The end time is selected by an SW 250, and a desired picture recording end time (18:00 in this example) is set using the SW 252 (time increment switch) or SW 251 (time decrement switch).

In the digest generation mode, various pieces of information are displayed at digest information positions 255, 256, and 257 of a display section 16 (when the digest is OFF, nothing is displayed). FIG. 17 is a view showing the data structure of digest video procedure information according to the fourth embodiment. In this example, a documentary program for 1 hr is recorded, and procedure 1 (capture interval: 5 min, minimum capture time: 2 sec, and allowable capture time: 30 sec) is selected from the digest procedures registered as shown in FIG. 17 using an SW 244 or 247. As described with reference to FIG. 2, each capture timing may be represented by a percentage.

Figure 18:
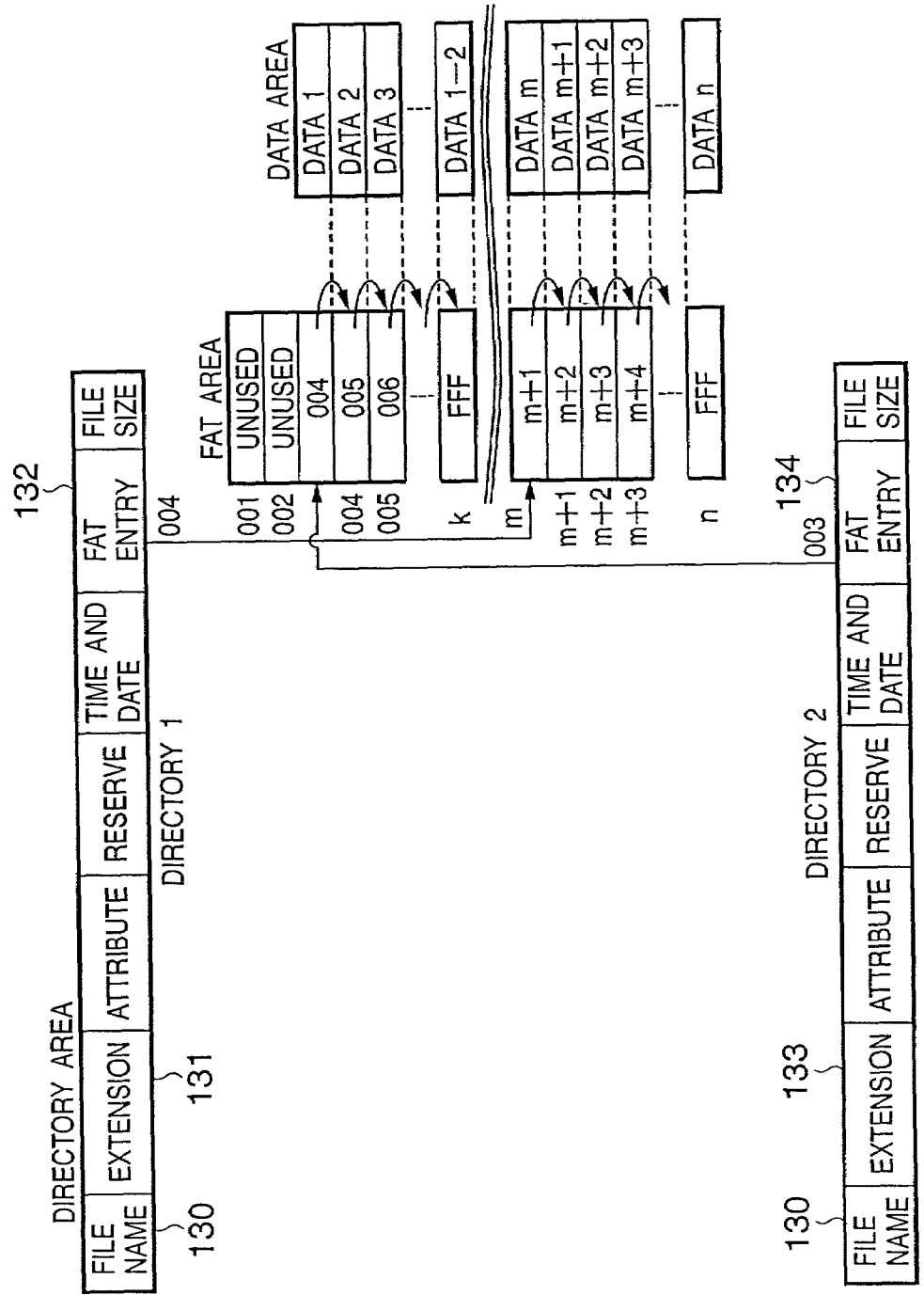
FIG. 18 is a view showing the file structure of a digital storage medium 100 according to the fourth embodiment.

It is determined in step S151 whether a picture recording reservation SW 148 is pressed, and if YES in step S151, the flow advances to step S152. In step S152, the procedure contents of the digest procedure input in step S150 are read out from a capture procedure storage section 182, and the number N of times of capture=12 (17:00, 17:05, 17:10, 17:50, and 17:55) is calculated from the picture recording time. In addition, setting for the file format of the digital storage medium is done. FIG. 18 is a view showing the file structure of the digital storage medium 100 according to the fourth embodiment. In step S152, "vdo" is written in an extension 131 of directory 1 shown in FIG. 18, and "dyg" is written in an extension 133 of directory 2. The first FAT entry (cluster number "003" in this example) is written in an area 134 of directory 2, and the first FAT entry (cluster number "m" in this example) is written in an area 132 of directory 1.

In step S153, the picture recording start time is waited. At the picture recording start time, the write of video and audio data in a data area corresponding to the cluster number designated by directory 1 of the digital storage medium 100 is started in step 154.

In step S155, it is determined whether the current time corresponds to a digest image capture timing. If YES in step S155, the flow advances to step S156 to detect punctuation in words from the output from the audio analysis section 19. The audio analysis section 19 outputs a signal of high level when words continue or a signal of low level when words discontinue. A portion at which the signal from the audio analysis section 19 changes from low level to high level is detected as punctuation in words. When punctuation in words is detected after the capture timing, the flow advances to step S158. In step S158, the address of the image which is currently being recorded is stored in the data area corresponding to the cluster number represented by directory 2 as a digest playback address.

While no word punctuation is detected in step S156, the flow advances to step S157 to monitor whether the time exceeds the allowable capture time.

When the digest video and audio recording starts in step S158, the flow advances to step S159 to determine whether the minimum capture time has elapsed. If YES in step S159, it is monitored in step S160 whether the output from the audio analysis section 19 has changed to low level. If YES in step S160, it is determined that punctuation in words is detected. In step S161, storage of the digest playback address is stopped, and the number N of times of capture calculated in step S152 is decremented by one. It is determined in step S162 whether the number N is 0. If NO in step S162, the flow returns to step S155 to wait the next capture permission.

In repeating steps S156 and S157, if the allowable time has elapsed before punctuation in words is detected, the flow advances to step S158 to start recording the digest video and audio data. While punctuation in words is waited in step S160, the elapse of allowable capture time is monitored in step S165. If the allowable capture time has elapsed, the flow advances to step S161 even when no punctuation in words is detected, and digest recording at that timing is ended. Hence, if no punctuation in words is detected before the elapse of allowable capture time in step S156, a video corresponding to the minimum capture time from that timing is recorded as a digest video. This prevents capture omission even when the audio data during the allowable capture time is mute.

This state will be described with reference to FIG. 19. FIG. 19 is a timing chart for explaining the digest capture timing in the fourth embodiment. In case 1, when capture is permitted, the audio data has already continued. Hence, the digest video is captured when the audio analysis section 19 is activated. In case 2, since an audio period longer than the minimum capture time and shorter than the allowable capture period is present, the digest video is captured until the audio period is ended. In case 3, no word punctuation is present (mute) during the allowable capture period. In this case, since no audio punctuation is detected even when the allowable capture period is ended, a minimum capture time digest playback video is captured.

In this way, the addresses for digest video playback are repeatedly captured in steps S155 to S162 and S165. When the final digest playback address is captured in step S162, the picture recording end time is waited in step S163. At the picture recording end time, the picture recording processing is ended. The recorded video data write is the same as in the second embodiment.

Since the numbers of clusters in which desired video and audio data are written are recorded in directory 2, a digest video with natural audio data can be played back by sequentially playing back the cluster numbers.

For example, when picture recording data is recorded as shown in FIG. 18, and a digest playback SW 155 is pressed, the data (video and audio data) are read out and played back from the data area corresponding to the designated cluster number (data 1 corresponding to cluster number 003 in this example) from directory information having an extension "dyg". The FAT area of the cluster is 004, so data corresponding to cluster number 004 is read out and played back as the next chain. When such processing is repeated until cluster number k, "FFF" is written in the FAT area. Since no next chain is present, playback is ended. Thus, the digest video and audio data are played back.

In the arrangement of the fourth embodiment as well, the digest video procedure information shown in FIG. 17 can be edited. In the data structure shown in FIG. 17, the capture interval, minimum capture time, and allowable capture time are edited.

In the fourth embodiment, the digest video data and audio data are stored in a data area independently of picture recording data. However, a cluster number at which a digest video in picture recording data and corresponding audio data are stored may be stored, as in the second embodiment.

As described above, according to the fourth embodiment, since digest data is composed in accordance with punctuation in words (audio data), a more natural digest video with audio data can be recorded and played back.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is achieved even by supplying a storage medium (or recording medium) which stores software program codes for implementing the functions of the above-described embodiments to the system or apparatus and causing the computer (or a CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the storage medium, the storage medium stores program codes corresponding to the above-described flow charts.

As has been described above, according to the present invention, digest image information can be automatically generated from image information, and additionally, digest image information appropriate to the image contents can be generated by changing the capture timing from the image information.

According to the present invention, since the image information capture timing is controlled in consideration of the audio state, digest image information with audio data for providing more natural playback contents can obtained.

As many apparently widely different embodiments of the present invention can be made without departing from the spirit and scope thereof, it is to be understood that the invention is not limited to the specific embodiments thereof except as defined in the appended claims.

What is claimed is:

1. A recording apparatus comprising:
    input means for inputting an image signal stream and genre information of the image signal stream;
    recording means for recording the image signal stream input by said input means on a storage device;
    storing means for storing a plurality of procedure information, each of the plurality of procedure information including (a) predetermined extraction timings and (b) predetermined extraction periods respectively corresponding to the predetermined extraction timings, to extract parts of image signals, the predetermined extraction timings defining a respective plurality of percentage values, and the plurality of procedure information being preliminarily generated and the plurality of procedure information being respectively associated with a plurality of genre information different from each other;
    selection means for selecting procedure information from the plurality of procedure information, based on the genre information of the image signal stream, for use when generating a digest image of the image signal stream input by said input means; and
    extraction means for extracting a part of image signals from the image signal stream to be recorded on the storage device, in accordance with the procedure information selected by said selection means,
    wherein each of the plurality of predetermined extraction timings is defined by a percentage value, and
    wherein said extraction means calculates actual extraction timings based on (a) a total time of the image signal stream from which the digest image is generated and (b) the procedure information selected by said selection means, and extracts, at each of the actual extraction timings, a part of image signals from the image signal stream, which part has a predetermined extraction period corresponding to a respective one of the predetermined extraction timings.

2. The apparatus according to claim 1, further comprising operation means for receiving operation input for generating a digest image,
    wherein said operation means is able to edit the predetermined extraction timings and/or the predetermined extraction periods of procedure information that has been stored by said storing means.

3. The apparatus according to claim 2, wherein said operation means further provides a creation display for creating a new procedure information.

4. The apparatus according to claim 1, wherein each of the plurality of procedure information includes a plurality of keywords, and
    wherein said selection means compares genre information of the image signal stream with the keywords and selects procedure information having a keyword corresponding to the genre information.

5. The apparatus according to claim 1, wherein the image signal stream is a program generated from a broadcast wave, and
    wherein the genre information is included in EPG data generated from the broadcast wave.

6. The apparatus according to claim 1, further comprising audio analysis means for analyzing an audio signal attached to the image signal stream and generating audio information,
    wherein said extraction means extracts a part of image signals from the image signal stream to be recorded on the storage device, based on the selected procedure information and the audio information generated by said audio analysis means.

7. The apparatus according to claim 1, wherein the storage device includes a magnetic tape, and
    wherein said recording means records the extracted image signal stream in a predetermined area on the magnetic tape.

8. The apparatus according to claim 1, wherein said extraction means generates extraction position information representing a recording position on the device for a part of image signals corresponding to the extraction timing in the image signal stream recorded on the storage device,
    wherein the storage device includes a random-accessible medium having a number of clusters, and
    wherein the extraction position information represents a position of a cluster on which a part of image signals corresponding to the extraction timing are recorded.

9. The apparatus according to claim 1, wherein each of the actual extraction timings calculated by said extraction means indicates an actual time based on a recording start time and a recording end time of the image signal stream from which the digest image is generated.

10. A recording method comprising:
   an input step of inputting an image signal stream and genre information of the image signal stream;
   a recording step of recording the image signal stream input by said input means on a storage device;
   a storing step of storing a plurality of procedure information, each of the plurality of procedure information including (a) predetermined extraction timings and (b) predetermined extraction periods respectively corresponding to the predetermined extraction timings, to extract parts of image signals, the predetermined extraction timings defining a respective plurality of percentage values, and the plurality of procedure information being preliminarily generated and the plurality of procedure information being respectively associated with a plurality of genre information different from each other;
   a selection step of selecting procedure information from the plurality of procedure information, based on the genre information of the image signal stream, for use when generating a digest image of the image signal stream input in said input step; and
   an extraction step of extracting a part of image signals from the image signal stream to be recorded on the storage device, in accordance with the procedure information selected in said selection step,
   wherein each of the plurality of predetermined extraction timings is defined by a percentage value, and
   wherein said extraction step calculates actual extraction timings based on (a) a total time of the image signal stream from which the digest image is generated and (b) the procedure information selected by said selection step, and extracts, at each of the actual extraction timings, a part of image signals from the image signal stream, which part has a predetermined extraction period corresponding to a respective one of the predetermined extraction timings.

11. The method according to claim 1, further comprising an operation step of receiving operation input for generating a digest image,
   wherein, in said operation step, the predetermined extraction timings and/or the predetermined extraction periods of procedure information that has been stored in said storing step are editable.

12. The method according to claim 11, wherein said operation step further includes a step of providing a creation display for creating a new procedure information.

13. The method according to claim 10, wherein each of the plurality of procedure information includes a plurality of keywords, and
   wherein said selection step includes a step of comparing genre information of the image signal stream with the keywords and a step of selecting procedure information having a keyword corresponding to the genre information.

14. The method according to claim 10, wherein the image signal stream is a program generated from a broadcast wave, and the genre information is included in EPG data generated from the broadcast wave.

15. The method according to claim 10, further comprising an audio analysis step of analyzing audio signal attached to the image signal stream and generating audio information,
   wherein, in said extraction step, a part of image signals is extracted from the image signal stream to be recorded on the storage device, based on the selected procedure information and the audio information generated in said audio analysis step.

16. The method according to claim 10, wherein the storage device include a magnetic tape, and
   wherein in said recording step, the extracted image signal stream is recorded in a predetermined area on the magnetic tape.

17. The method according to claim 10, wherein said extraction step generates extraction position information representing a recording position on the device for a part of image signals corresponding to the extraction timing in the image signal stream recorded on the storage device,
   wherein the storage device includes a random-accessible medium having a number of clusters, and
   wherein the extraction position information represents a position of a cluster on which a part of image signals corresponding to the extraction timing are recorded.

18. A computer-readable medium storing a computer program for causing an apparatus to effect a method according to claim 10.

19. The method according to claim 10, wherein each of the actual extraction timings calculated in said extraction step indicates an actual time based on a recording start time and a recording end time of the image signal stream from which the digest image is generated.

* * * * *

UNITED STATES PATENT AND TRADEMARK OFFICE
CERTIFICATE OF CORRECTION

PATENT NO. : 7,187,846 B2
APPLICATION NO. : 09/875191
DATED : March 6, 2007
INVENTOR(S) : Akio Saito It is certified that error appears in the above-identified patent and that said Letters Patent is hereby corrected as shown below:

COLUMN 2:
Line 28, "of," should read --of--.

COLUMN 7:
Line 44, "FIG., 2A," should read --FIG. 2A,--.

COLUMN 8:
Line 6, "FIG., 2A" should read --FIG. 2A--.
Line 50, "15 sec" should read --5 sec--.

COLUMN 9:
Line 55, " "movie" " should read --("movie"--.

COLUMN 10:
Line 47, "executing" should read --executed--.

COLUMN 11:
Line 13, "SW-135." should read --SW 135.--.

COLUMN 13:
Line 33, "FIG., 12." should read --FIG. 12.--.
Line 61, "FIG. 2a" should read --FIG. 2A--.

COLUMN 19:
Line 38, "claim 1," should read --claim 10,--.

UNITED STATES PATENT AND TRADEMARK OFFICE
CERTIFICATE OF CORRECTION

PATENT NO.        : 7,187,846 B2
APPLICATION NO. : 09/875191
DATED             : March 6, 2007
INVENTOR(S)       : Akio Saito It is certified that error appears in the above-identified patent and that said Letters Patent is hereby corrected as shown below:

COLUMN 20:
Line 14, "audio signal" should read --an audio signal--.
Line 22, "include" should read --includes--.

Signed and Sealed this

Sixth Day of November, 2007

JON W. DUDAS
*Director of the United States Patent and Trademark Office*